United States Patent
Liang

(10) Patent No.: US 11,380,131 B2
(45) Date of Patent: Jul. 5, 2022

(54) METHOD AND DEVICE FOR FACE RECOGNITION, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 164 days.

(21) Appl. No.: 16/730,571

(22) Filed: Dec. 30, 2019

(65) Prior Publication Data
US 2020/0134294 A1 Apr. 30, 2020

Related U.S. Application Data

(63) Continuation of application No. PCT/CN2017/091378, filed on Jun. 30, 2017.

(51) Int. Cl.
*G06K 9/62* (2022.01)
*G06V 40/16* (2022.01)

(52) U.S. Cl.
CPC ............. *G06V 40/171* (2022.01); *G06K 9/62* (2013.01); *G06V 40/178* (2022.01)

(58) Field of Classification Search
CPC ............................ G06K 9/00281; G06K 9/62
See application file for complete search history.

(56) References Cited

U.S. PATENT DOCUMENTS 10,956,759 B1* 3/2021 Pertsel .................. B60W 40/08
2006/0034542 A1* 2/2006 Aoyama ................ G06K 9/522
382/276
(Continued)

FOREIGN PATENT DOCUMENTS

CN 106295499 A 1/2017
CN 106469298 A 3/2017
(Continued)

OTHER PUBLICATIONS

Suo et al., "A Compositional and Dynamic Model for Face Aging," IEEE Transactions on Pattern Analysis and Machine Intelligence, vol. 32, No. 3, Mar. 2010 (Year: 2010).*
(Continued)

*Primary Examiner* — Soo Shin
(74) *Attorney, Agent, or Firm* — Young Basile Hanlon & MacFarlane, P.C.

(57) ABSTRACT

A method and device for face recognition, a storage medium, and an electronic device are provided. The method includes the following. Face data to-be-tested is obtained. A first derived face data set related to the face data to-be-tested is generated according to the face data to-be-tested. For each of multiple derived face data in the first derived face data set, perform age determination, and generate an age distribution interval corresponding to the first derived face data set. Whether the age distribution interval matches a first reference age interval is determined. Upon determining that the age distribution interval matches the first reference age interval, age data corresponding to the face data to-be-tested is obtained according to the age distribution interval.

20 Claims, 8 Drawing Sheets

(56) References Cited

U.S. PATENT DOCUMENTS

| | | | |
|---|---|---|---|
| 2014/0099029 A1 | 4/2014 | Savvides et al. | |
| 2014/0376786 A1* | 12/2014 | Johnson | G06F 16/5838 382/118 |
| 2015/0178554 A1* | 6/2015 | Kanaujia | G06K 9/00288 382/118 |
| 2020/0134294 A1* | 4/2020 | Liang | G06K 9/00268 |
| 2021/0192186 A1* | 6/2021 | Kim | G06K 9/00221 |
| 2021/0211823 A1* | 7/2021 | Shani | H04R 1/403 |

FOREIGN PATENT DOCUMENTS

| | | | |
|---|---|---|---|
| CN | 106503623 A | 3/2017 | |
| WO | WO-2020199932 A1 * | 10/2020 | G06K 9/6256 |

OTHER PUBLICATIONS

Zheng et al., "Age Estimation Guided Convolutional Neural Network for Age-Invariant Face Recognition," 2017 IEEE Conference on Computer Vision and Pattern Recognition Workshops, Jul. 21-26, 2017 (Year: 2017).*

Farazdaghi et al., "Reverse Facial Ageing Model for Youthful Appearance Restoration from Adult Face Images," 2016 6th European Workshop on Visual Information Processing (EUVIP), Oct. 25-27, 2016 (Year: 2016).*

International search report issued in corresponding international application No. PCT/CN2017/091378 dated Mar. 28, 2018.

Jinli Suo et al: "A Compositional and Dynamic Model for Face Aging", IEEE Transactions on Pattern Analysis and Machine Intelligence, IEEE Computer Society, USA, vol. 32, No. 3, Mar. 1, 2010 (Mar. 1, 2010), pp. 385-401, XP011280708, ISSN: 0162-8828, DOI: 10.1109/TPAMI.2009.39.

Sung Eun Choi et al: "Age estimation using a hierarchical classifier based on global and local facial features", Pattern Recognition, Elsevier, GB, vol. 44, No. 6, Dec. 7, 2010 (Dec. 7, 2010), pp. 1262-1281, XP028136016, ISSN: 0031-3203, DOI: 10.1016/J.PATCOG.2010.12.005.

Malli Refik Can et al: "Apparent Age Estimation Using Ensemble of Deep Learning Models" 2016 IEEE Conference On Computer Vision and Pattern Recognition Workshops (CVPRW), IEEE, Jun. 26, 2016(Jun. 26, 2016), pp. 714-721, XP033027890, DOI: 10.1109/CVPRW.2016.94.

Grigory Antipov et al: "Face Aging With Conditional Generative Adversarial Networks", arxiv.org, Cornell University Library, 201 Olin Library Cornell University Ithaca, NY 14853, Feb. 7, 2017(Feb. 7, 2017),XP080746931 ,DOI:10.1109/ICIP.2017.8296650.

Rothe Rasmus et al: "DEX: Deep Expectation of Apparent Age from a Single Image", 2015 IEEE International Conference on Computer Vision Workshop (ICCVW), IEEE. Dec. 7, 2015 (Dec. 7, 2015), pp. 252-257, XP032864971, DOI: 10.1109/CCVW.2015.41.

Extended European search report issued in corresponding European application No. 17915349.9 dated Jun. 5, 2020.

Communication pursuant to Article 94(3) EPC issued in corresponding European application No. 17915349.9 dated Jun. 17, 2021.

First examination report issued in corresponding IN application No. 202017002068 dated Aug. 25, 2021.

* cited by examiner

METHOD AND DEVICE FOR FACE RECOGNITION, STORAGE MEDIUM, AND ELECTRONIC DEVICE

CROSS-REFERENCE TO RELATED APPLICATION(S)

This application is a continuation of International Application No. PCT/CN2017/091378, filed on Jun. 30, 2017, the disclosure of which is hereby incorporated by reference in its entirety.

TECHNICAL FIELD

This disclosure relates to the technical field of data processing, and more particularly to a method and device for face recognition, a storage medium, and an electronic device.

BACKGROUND

With the rapid development of electronic devices, the electronic devices have become an essential part in people's daily life. In particular, various functions provided by a variety of applications installed in mobile terminals provide users with diverse experiences, and people rely increasingly on entertainment and convenience brought by various applications.

At present, the electronic devices can easily obtain photo, image, or other information. People are exposed to a large amount of photo, image, or other information during use of the electronic devices. In some cases, people may be interested in ages of persons in a photo when browsing through photo, image, or other information. In general, people determine the age of a target person in an image with their own experience by making a rough estimate based on the appearance of the target person. However, it is difficult to determine accurately an actual age of the target person in the image based only on experience.

SUMMARY

In a first aspect, a method for face recognition is provided. The method for face recognition includes the following. Face data to-be-tested is obtained. A first derived face data set related to the face data to-be-tested is generated according to the face data to-be-tested, where the first derived face data set includes multiple different derived face data. For each of the multiple different derived face data in the first derived face data set, age determination is performed, and an age distribution interval corresponding to the first derived face data set is generated. Whether the age distribution interval matches a first reference age interval is determined. Upon determining that the age distribution interval matches the first reference age interval, age data corresponding to the face data to-be-tested is obtained according to the age distribution interval.

In a second aspect, a non-transitory computer readable storage medium is further provided. The non-transitory computer readable storage medium is configured to store instructions. The instructions, when executed by a processor, cause the processor to carry out part or all of the operations described in any method of the first aspect.

In a third aspect, an electronic device is further provided. The electronic device includes at least one processor and a computer readable storage. The computer readable storage is coupled to the at least one processor and stores at least one computer executable instruction thereon which, when executed by the at least one processor, is operable with the at least one processor to carry out part or all of the operations described in any method of the first aspect.

DETAILED DESCRIPTION

Figure 1:
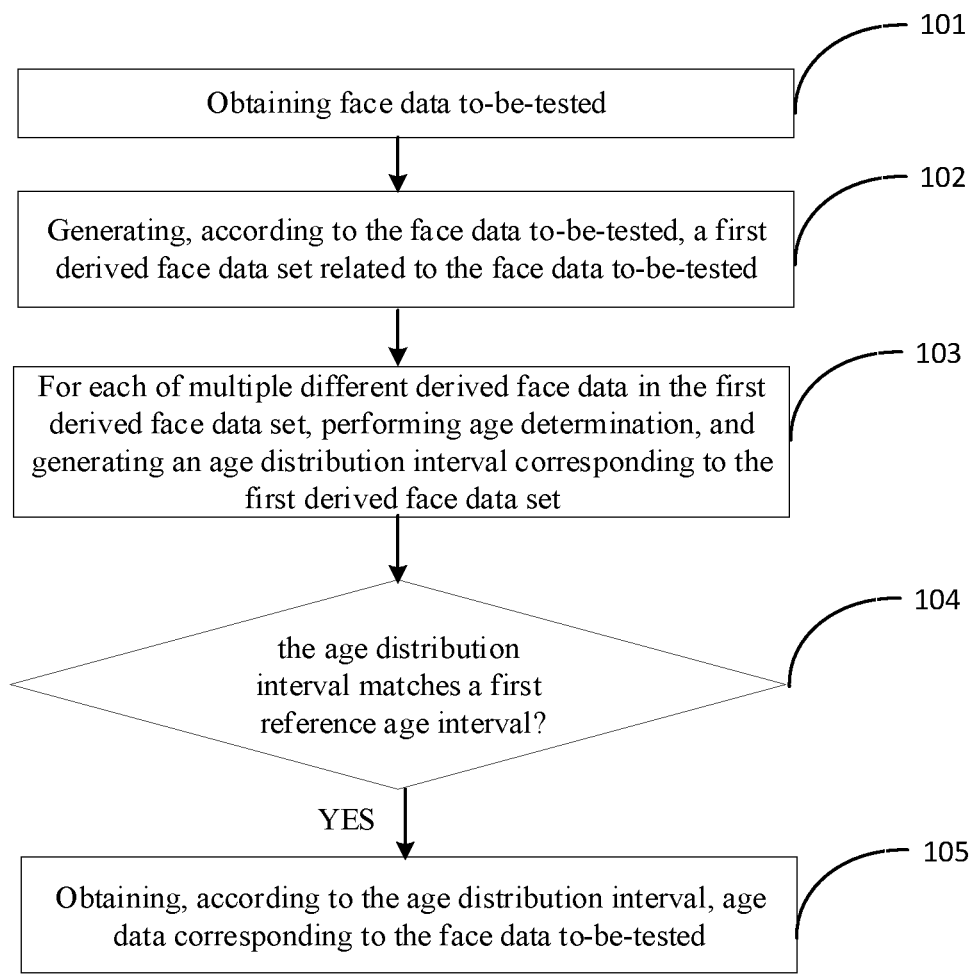
FIG. 1 is a schematic flowchart illustrating a method for face recognition according to embodiments.

In the accompanying drawings, the same reference numerals refer to the same components. The principle of the disclosure is illustrated in conjunction with a proper computing environment. The following description is based on example embodiments of the disclosure and should not be construed as limiting the disclosure.

In the following, specific embodiments of the disclosure will be illustrated in connection with steps and operations that are executed by one or more computers (unless stated otherwise). Therefore, these steps and operations may be mentioned several times as being performed by a computer. The computer referred to herein includes a computer processing unit that performs operations that represent electronic signals in a structured form of data. The operation may convert the data or maintain the data at a location of memory system of the computer, which may be reconfigured or used to change the operation of the computer in a manner well known to those skilled in the art. The data structure maintained by the data is a physical location of the memory, which has specific characteristics defined by a data format. However, the principle of the disclosure described above are not intended to limit the disclosure, and those skilled in the art will appreciate that the various steps and operations described below can be implemented in hardware.

The term "module" used herein may be a software object that is executed on a computing system. Different components, modules, engines, and services referred to herein may be implemented on the computing system. The device and method described herein may be implemented in software or in hardware, which shall all be encompassed within the protection scope of the disclosure.

The terms "first", "second", "third", and the like used in the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units. Instead, it can optionally include other steps or units that are not listed, or other steps or units inherent to the process, method, product, or device can also be included.

The term "embodiment" referred to herein means that particular features, structures, or properties described in conjunction with the embodiments may be defined in at least one embodiment of the disclosure. The phrase "embodiment" appearing in various places in the specification does not necessarily refer to the same embodiment or an independent/alternative embodiment that is mutually exclusive with other embodiments. Those skilled in the art will understand explicitly and implicitly that an embodiment described herein may be combined with other embodiments.

According to embodiments, a method for face recognition is provided. The method includes the following. Face data to-be-tested is obtained. A first derived face data set related to the face data to-be-tested is generated according to the face data to-be-tested, where the first derived face data set includes multiple different derived face data. For each of the multiple different derived face data in the first derived face data set, age determination is performed. An age distribution interval corresponding to the first derived face data set is generated. Whether the age distribution interval matches a first reference age interval is determined. Upon determining that the age distribution interval matches the first reference age interval, age data corresponding to the face data to-be-tested is obtained according to the age distribution interval.

In some embodiments, the first derived face data set related to the face data to-be-tested is generated according to the face data to-be-tested as follows. The first derived face data set related to the face data to-be-tested is generated according to the face data to-be-tested based on a predetermined face data generating model.

In some embodiments, prior to generating, according to the face data to-be-tested, the first derived face data set related to the face data to-be-tested, the method further includes the following. Reference face data is obtained. A second derived face data set related to the reference face data is generated according to the reference face data, where the second derived face data set includes multiple different derived face data. For each of the multiple different derived face data in the second derived face data set, age determination is performed. An age distribution interval corresponding to the second derived face data set is generated. Whether the age distribution interval corresponding to the second derived face data set matches a second reference age interval is determined. Upon determining that the age distribution interval corresponding to the second derived face data set does not match the second reference age interval, model parameters of the face data generating model are updated, until the age distribution interval corresponding to the second derived face data set and obtained by performing age determination on each of the multiple different derived face data in the second derived face data set matches the second reference age interval.

In some embodiments, age determination is performed on each of the multiple different derived face data in the first derived face data set and the age distribution interval corresponding to the first derived face data set is generated as follows. For each of the multiple different derived face data in the first derived face data set, an age corresponding thereto is determined based on a predetermined age determining model. The age distribution interval corresponding to the first derived face data set is generated. The age determining model is configured to extract feature data from the derived face data and determine age data corresponding to the feature data.

In some embodiments, the age determining model includes multiple feature-data determining models. Each of the multiple feature-data determining models is configured to determine feature data of a preset type and obtain, according to the feature data of the preset type, age data corresponding to the feature data of the preset type.

In some embodiments, prior to performing age determination on each of the multiple different derived face data in the first derived face data set based on the predetermined age determining model and generating the age distribution interval corresponding to the first derived face data set, the method further includes the following. Reference face data is obtained, where the reference face data includes age data. Feature data corresponding to the reference face data is extracted according to the reference face data. The age determining model is generated by associating the feature data with the age data corresponding to the feature data.

In some embodiments, the feature data is obtained from face data by deep learning and a convolutional neural network.

In some embodiments, the age determining model is generated by associating multiple feature-data determining models according to preset weights.

In some embodiments, whether the age distribution interval matches the first reference age interval is determined as follows. Whether a degree of correlation between the age distribution interval obtained by performing age determination on each of the multiple different derived face data in the first derived face data set and the first reference age interval is greater than a preset threshold is determined. The age data corresponding to the face data to-be-tested is obtained according to the age distribution interval upon determining that the age distribution interval matches the first reference age interval as follows. Upon determining that the degree of correlation is greater than the preset threshold, the age data corresponding to the face data to-be-tested is obtained according to the age distribution interval.

In some embodiments, the first derived face data set related to the face data to-be-tested is generated according to the face data to-be-tested as follows. Face aging and face rejuvenation are performed on the face data to-be-tested in terms of different preset ages, and the multiple derived face data which represent different ages and are related to the face data to-be-tested are generated. The first derived face data set is obtained by distributing the multiple derived face data sequentially according to ages corresponding to the multiple derived face data.

In some embodiments, the age data corresponding to the face data to-be-tested is obtained according to the age distribution interval upon determining that the age distribution interval matches the first reference age interval as follows. Age median data corresponding to the age distribution interval is obtained according to the age distribution interval. The age median data is used as the age data corresponding to the face data to-be-tested.

According to embodiments, a non-transitory computer readable storage medium is provided. The non-transitory computer readable storage medium is configured to store instructions which, when executed by a processor, cause the processor to carry out following actions. Face data to-be-tested is obtained. A first derived face data set related to the face data to-be-tested is generated according to the face data to-be-tested, where the first derived face data set includes multiple different derived face data. For each of the multiple different derived face data in the first derived face data set, age determination is performed, and an age distribution interval corresponding to the first derived face data set is generated. Whether the age distribution interval matches a first reference age interval is determined. Upon determining that the age distribution interval matches the first reference age interval, age data corresponding to the face data to-be-tested is obtained according to the age distribution interval.

According to embodiments, an electronic device is provided. The electronic device includes at least one processor and a computer readable storage. The computer readable storage is coupled to the at least one processor and stores at least one computer executable instruction which, when executed by the at least one processor, is operable with the at least one processor to carry out following actions. Face data to-be-tested is obtained. A first derived face data set related to the face data to-be-tested is generated according to the face data to-be-tested, where the first derived face data set includes multiple different derived face data. For each of the multiple different derived face data in the first derived face data set, age determination is performed, and an age distribution interval corresponding to the first derived face data set is generated. Whether the age distribution interval matches a first reference age interval is determined. Upon determining that the age distribution interval matches the first reference age interval, age data corresponding to the face data to-be-tested is obtained according to the age distribution interval.

Hereinafter, technical solutions of the disclosure will be described in detail with reference to accompanying drawings and embodiments.

FIG. 1 is a schematic flowchart illustrating a method for face recognition according to embodiments. For the convenience of description, only contents related to the embodiments are illustrated in the accompanying drawings.

The method for face recognition is applicable to an electronic device that can be configured for data processing. The method includes the following.

At block 101, face data to-be-tested is obtained.

In some embodiments, face data may be in a form of a data set, an image, or the like related to a face. The face data to-be-tested may be obtained by confirming in an electronic device through manual input or manual selection, or may be obtained through selection and extraction by means of preset programs.

As an example, by means of an application of a mobile phone, an image having a face in an image set of the mobile phone can be selected, and as such, the image selected can be determined as the face data to-be-tested. As another example, for an image having multiple faces, a position of each of the multiple faces in the image can be determined by a face detection algorithm, and then face data desired can be extracted according to the position of each of the multiple faces in the image. The above examples are for illustrative purposes only, and should not be understood as restriction on the manner in which the face data to-be-tested of the disclosure is obtained. In practice, the face data to-be-tested can be obtained in various manners.

For ease of description, in the following embodiments, the face data is illustrated in a form of an image.

At 102, a first derived face data set related to the face data to-be-tested is generated according to the face data to-be-tested, where the first derived face data set includes multiple different derived face data.

In some embodiments, the first derived face data set can be generated according to the face data to-be-tested, and the first derived face data set includes multiple different derived face data corresponding to the face data to-be-tested. In a generating process, the first derived face data set may be generated according to the face data to-be-tested through a preset generator, where the generator may be used to generate face data (i.e., derived face data) based on feature data of a face. It may be understood that, if derived face data is generated through a generator, face features corresponding to derived face data generated will be identical with or similar to face features corresponding to the face data to-be-tested, or face features corresponding to derived face data generated will be varied in an expected manner. For details, reference may be made to related descriptions in the following embodiments. For example, if the first derived face data set is generated by adopting feature data-based generation method, a system extracts feature data concerning face contour, facial features (that is, eyebrows, eyes, nose, mouth, ears), skin, expression, hairstyle, and so on from the face data to-be-tested, and then derived face data corresponding to the feature data extracted is generated according to some face-feature association rules (e.g., association between faces corresponding to different ages or different regions) summarized from a face database.

In the following, take a generating process based on facial features in the feature data as an example for illustration. A system extracts feature data concerning the facial features (or can be referred to as "facial feature A") from the face data to-be-tested. In a process of generating the first derived face data set, according to association between features corresponding to different ages, feature data concerning the facial features (or can be referred to as "facial feature $A_1$") is generated based on "facial feature A" varied at a certain age interval (e.g., aged by 2 years old), and "facial feature $A_1$" is then added to derived face data generated. It should be understood that, if a generating model (i.e., a generator) is reliable, a result obtained by performing age determination on newly generated derived face data based on certain feature data and a result obtained by performing age determination on the original face data to-be-tested based on the certain feature data should also differ by about 2 years old.

The above examples are merely described in conjunction with "facial feature A". Since a generating principle in terms of other types of feature data (where other types of feature data at least include face contour, skin, expression, hairstyle, etc.) is similar to a generating principle in terms of "facial feature A". To this end, for details of generating other types of feature data to be added to derived face data, reference can be made to the above examples. The various types of feature data may be synthesized according to some rules to achieve generation of the whole derived face data.

The number of the derived face data in the first derived face data set generated and the age distribution of the first derived face data set generated may be set according to actual needs. For instance, the first derived face data set includes ten derived face data, where derived face data in the first derived face data set are generated based on association between face features (that is, features of a face) corresponding to different ages and two adjacent derived face data have a difference of 0.5 year old aging or rejuvenation. Specifically, obtain five derived face data, where ages corresponding to the five derived face data are aged by 0.5 year old, 1 year old, 1.5 years old, 2 years old, and 2.5 years old respectively, compared with an age corresponding to the original face data to-be-tested. Obtain another five derived face data, where ages corresponding to another five derived face data are younger by 0.5 year old, 1 year old, 1.5 years old, 2 years old, and 2.5 years old respectively, compared with the age corresponding to the original face data to-be-tested. The number of the derived face data obtained after aging process and the number of the derived face data obtained after rejuvenation process are the same. In this way, a first derived face data set which includes ten derived face data and corresponds to an age distribution interval of ±2.5 years old relative to an age of the face data to-be-tested is generated.

At block 103, for each of the multiple different derived face data in the first derived face data set, age determination is performed, and an age distribution interval corresponding to the first derived face data set is generated.

In some embodiments, age determination is performed on the multiple derived face data in the first derived face data set based on a predetermined algorithm. As an example, if the first derived face data set includes ten derived face data, in performance of age determination, ten age data can be obtained by performing age determination on each of the ten derived face data.

Then, the age distribution interval is generated according to the ten age data. As an example, if age data corresponding to derived face data in the first derived face data set has the greatest value, for example, 30 years old, and age data corresponding to another derived face data in the first derived face data set has the smallest value, for example, 25 years old, based on a result of the two age data (i.e., two ends), it can be determined that the age distribution interval corresponding to the first derived face data set is 25-30 years old.

The number of derived face data and a manner of division of the interval can be adjusted according to a practical situation. According to the above manner, the derived face data for detection related to the face data to-be-tested can be effectively expanded, and therefore a fault tolerance rate of face age recognition can be improved based on the generated derived face data. As such, accuracy of age determination can be improved.

At block 104, whether the age distribution interval matches a first reference age interval is determined.

In some embodiments, a reference age interval may be obtained by performing age determination according to the face data to-be-tested through a generator, where the generator is obtained based on a preset face database. The face database may be an AFAD database, an AFLW database, or some other commercial face database which can provide sufficient reference face data, so that the confidence of reference information is sufficiently high.

In a matching process, the age distribution interval generated by performing age determination on each of the multiple different derived face data in the first derived face data set is compared with the first reference age interval. For example, median data, average data, endpoint data, or other data of the age distribution interval generated and the first reference age interval may be obtained for comparison. A difference of data obtained from the two intervals is obtained. Whether the difference is smaller than a preset threshold is determined. If the difference is smaller than the preset threshold, determine that the age distribution interval generated matches the first reference age interval. Otherwise, determine that the age distribution interval generated does not match the first reference age interval. Certainly, a specific judgment condition (e.g., the preset threshold) may be set according to actual needs, which is not limited herein.

As an example, the age distribution interval generated by performing age determination on each of the multiple different derived face data in the first derived face data set is 25-29 years old, and the first reference age interval obtained according to the face data to-be-tested based on a face database is 27-31 years old. In order to determine a degree of matching of the age distribution interval generated and the first reference age interval obtained, a difference between the median of the age distribution interval generated and the median of the first reference age interval obtained is calculated. Based on the above, the median of the age distribution interval corresponding to the first derived face data set is 27 (i.e., (25+29)/2=27), and the median of the first reference age interval is 29 (i.e., (27+31)/2=29). If an acceptable difference range is ±3, and a result of subtracting 27 from 29 is less than 3 (i.e., 29-27<3), determine that the age distribution interval corresponding to the first derived face data set matches the first reference age interval obtained based on the face database. Then the median is selected from the age distribution interval as age data corresponding to the face data to-be-tested. If the acceptable difference range is ±1, determine that the age distribution interval corresponding to the first derived face data set does not match the first reference age interval obtained based on the face database. In this case, endpoint values of the age distribution interval are adjusted until the age distribution interval matches the first reference age interval. In some embodiments, values of age distribution of the age distribution interval may be adjusted (e.g., increasing or decreasing), and the comparison is performed again. The median of the age distribution interval adjusted is output when a matching condition is satisfied. By generating the first derived face data set according to the face data to-be-tested and performing age determination on each of the multiple derived face data in the first derived face data set, the problem of large deviations in age determination caused by strong light or weak light during shooting can be effectively avoided, which improves accuracy of face age recognition.

At block 105, upon determining that the age distribution interval matches the first reference age interval, age data corresponding to the face data to-be-tested is obtained according to the age distribution interval.

In some embodiments, the age distribution interval is generated based on association between face features (that is, features of a face) corresponding to different ages on the basis of aging or rejuvenation by a certain age between two adjacent derived face data. In this case, if the age distribution interval matches the first reference age interval, the median or average of two endpoints (i.e., maximum value and minimum value) of the age distribution interval generated is used as the age data corresponding to the face data to-be-tested. If the age distribution interval is generated in other manners, the age data corresponding to the face data to-be-tested may also be obtained according to other age values in the age distribution interval.

As an example, the age distribution interval generated by performing age determination on derived face data in the first derived face data set is 25-29 years old, and derived face data in the first derived face data set is generated by performing aging or rejuvenation (process) on the face data to-be-tested in terms of a specific age based on association between face features corresponding to different ages. Specifically, ages corresponding to five derived face data are aged by 0.5 year old, 1 year old, 1.5 years old, 2 years old, and 2.5 years old (compared with an age corresponding to the original face data to-be-tested) respectively. Ages corresponding to another five derived face data are younger by 0.5 year old, 1 year old, 1.5 years old, 2 years old, and 2.5 years old (compared with the age corresponding to the original face data to-be-tested) respectively. The number of the derived face data obtained after aging process and the number of the derived face data obtained after rejuvenation process are the same, and therefore ten derived face data are obtained in total. The age data corresponding to the face data to-be-tested can be the median of the age distribution interval of 25-29 years old (i.e., (25+29)/2=27 years old). In this way, accurate age data corresponding to the face data to-be-tested can be obtained according to the age distribution interval.

According to embodiments, the face data to-be-tested is obtained. Then, the first derived face data set (where the first derived face data set includes multiple different derived face data) related to the face data to-be-tested is generated according to the face data to-be-tested, to expand face-data samples related to the face data to-be-tested based on the first derived face data set. Age determination is performed on each of the multiple different derived face data in the first derived face data set, and the age distribution interval corresponding to the first derived face data set is generated. The age distribution interval is obtained by performing age determination based on the first derived face data set, which can widen a value of a certain point to values distributed in a certain distribution interval, thereby improving a fault tolerance rate of face age determination. In addition, whether the age distribution interval matches the first reference age interval is determined. If the matching is successful, the age data corresponding to the face data to-be-tested is obtained according to the age distribution interval. According to the foregoing face recognition method, the age distribution interval generated according to the face data to-be-tested can be obtained, and the age data corresponding to the face data to-be-tested can be determined according to the age distribution interval. In this way, the problem of poor recognition accuracy due to an unsatisfactory image angle, overexposure, or darkness can be effectively solved during determination of an age corresponding to the face data to-be-tested, thereby improving a fault tolerance rate of algorithms during age determination. As such, face age recognition algorithms can be dynamically applicable to various environments and accuracy of face age recognition can be greatly improved.

Figure 2:
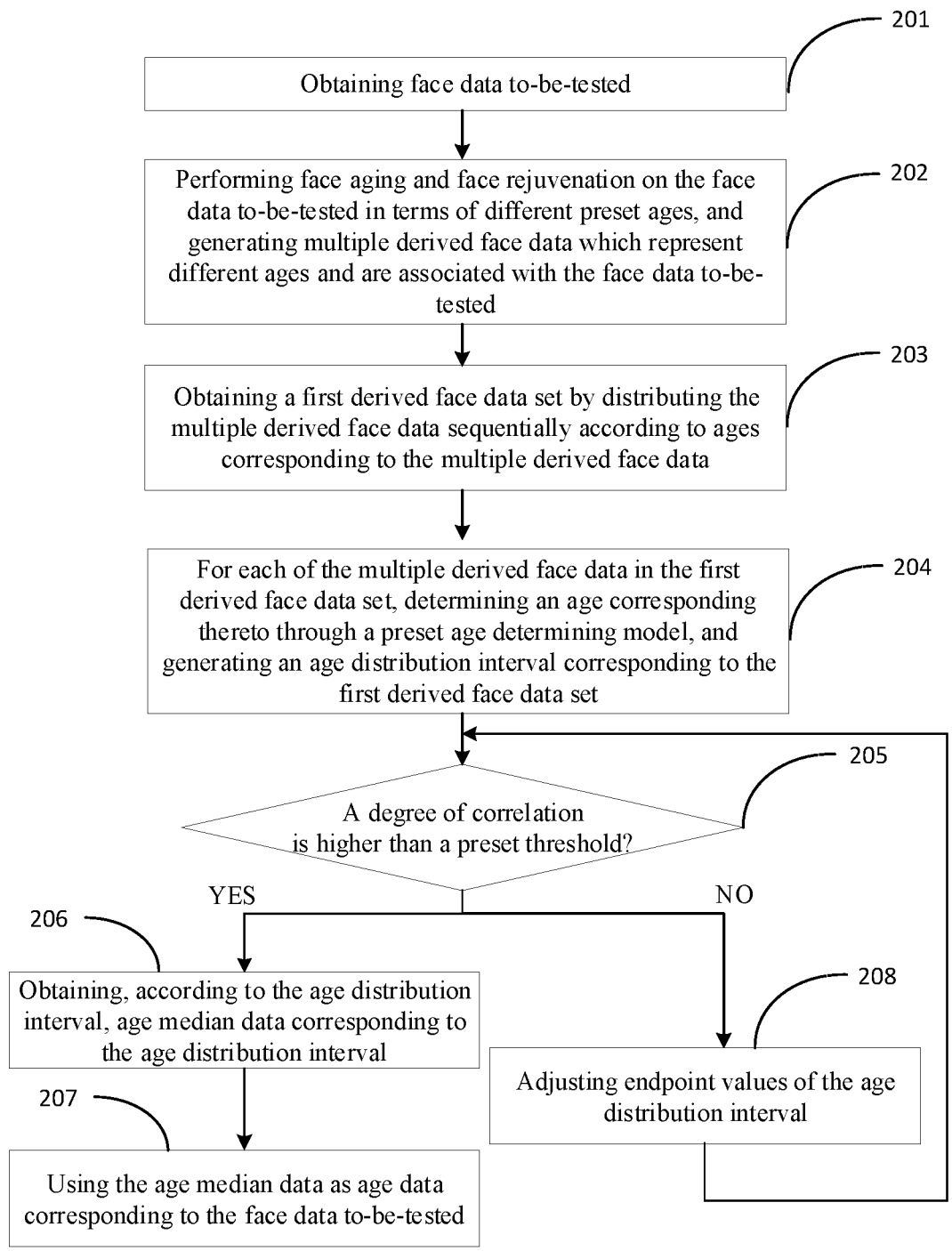
FIG. 2 is a schematic flowchart illustrating a method for face recognition according to other embodiments.

FIG. 2 is a schematic flowchart illustrating a method for face recognition according to other embodiments. For convenience of description, only parts related to the embodiments are illustrated.

At block 201, face data to-be-tested is obtained.

In some embodiments, face data may be in a form of a data set, an image, or the like related to a face. The face data to-be-tested may be obtained by confirming in an electronic device through manual input or manual selection, or may be obtained through selection and extraction by means of preset programs.

As an example, by means of an application of a mobile phone, an image having a face in an image set of the mobile phone can be selected, and accordingly, the image selected can be determined as the face data to-be-tested. As another example, for an image having multiple faces, a position of each of the multiple faces in the image can be determined by a face detection algorithm, and then face data desired can be extracted according to the position of each of the multiple faces in the image. The above examples are merely illustrative, and should not be understood as limiting the manner in which the face data to-be-tested of the disclosure is obtained. In practice, there can be various manners in which the face data to-be-tested is obtained.

In some embodiments, a first derived face data set related to the face data to-be-tested is generated through a predetermined face data generating model (i.e., a preset generator) according to the face data to-be-tested, where the first derived face data set includes multiple different derived face data.

At block 202, perform face aging and face rejuvenation on the face data to-be-tested in terms of different preset ages, and generate multiple derived face data which represent different ages and are related to the face data to-be-tested.

At block 203, a first derived face data set is obtained by distributing the multiple derived face data sequentially according to ages corresponding to the multiple derived face data, where the first derived face data set includes the multiple different derived face data.

If the first derived face data set is generated by adopting feature data-based generation method, a system extracts feature data concerning face contour, facial features, skin, expression, hairstyle, and so on from the face data to-be-tested, and then derived face data corresponding to the feature data extracted is generated according to some face-feature association rules (e.g., association between faces corresponding to different ages or association between faces corresponding to different regions) summarized from a face database.

In the following, a generating process based on facial features in the feature data is taken as an example for illustration. A system extracts feature data concerning the facial features (or can be referred to as "facial feature A") from the face data to-be-tested. In a process of generating the first derived face data set, according to association between features corresponding to different ages, feature data concerning the facial features (or can be referred to as "facial feature $A_1$") is generated based on "facial feature A" varied at a certain age interval (e.g., aged by 2 years old), and "facial feature $A_1$" is then added to derived face data generated. It should be understood that, if a generating model (i.e., a generator) is reliable, a result obtained by performing age determination on newly generated derived face data based on certain feature data and a result obtained by performing age determination on the original face data to-be-tested based on the certain feature data should also differ by about 2 years old.

The above examples are merely described in conjunction with "facial feature A". Since a generating principle in terms of other types of feature data (where other types of feature data at least include face contour, skin, expression, hairstyle, etc.) is similar to a generating principle in terms of "facial feature A". To this end, for details of generating other types of feature data to be added to derived face data, reference can be made to the above examples. The various types of feature data may be synthesized according to some rules to implement generation of the whole derived face data.

The number of the derived face data in the first derived face data set generated and the age distribution of the first derived face data set generated may be set according to actual needs. For instance, the first derived face data set includes ten derived face data, where derived face data in the first derived face data set are generated based on association between face features (that is, features of a face) corresponding to different ages and two adjacent derived face data have a difference of 0.5 year old aging or rejuvenation. Specifically, obtain five derived face data, where ages corresponding to the five derived face data are aged by 0.5 year old, 1 year old, 1.5 years old, 2 years old, and 2.5 years old respectively, compared with an age corresponding to the original face data to-be-tested. Obtain another five derived face data, where ages corresponding to another five derived face data are younger by 0.5 year old, 1 year old, 1.5 years old, 2 years old, and 2.5 years old respectively, compared with the age corresponding to the original face data to-be-tested. The number of the derived face data obtained after aging process and the number of the derived face data obtained after rejuvenation process are the same. In this way, a first derived face data set which includes ten derived face data and corresponds to an age distribution interval of ±2.5 years old relative to an age of the face data to-be-tested is generated.

In some embodiments, in order to improve the confidence of the first derived face data set generated through a face data generating model (i.e., a generator), the generator can be trained by introducing a generative adversarial network (GAN).

At block 204, for each of the multiple different derived face data in the first derived face data set, determine an age corresponding thereto based on a predetermined age determining model (where the age determining model is configured to extract feature data from the derived face data and determine age data corresponding to the feature data), and an age distribution interval corresponding to the first derived face data set is generated.

In addition, the age determining model includes multiple feature-data determining models. Each of the multiple feature-data determining models is configured to determine feature data of a preset type and obtain, according to the feature data of the preset type, age data corresponding to the feature data of the preset type. It should be understood that, each feature-data determining model is configured to provide an age determination result based on feature data corresponding to the feature-data determining model.

Figure 3:
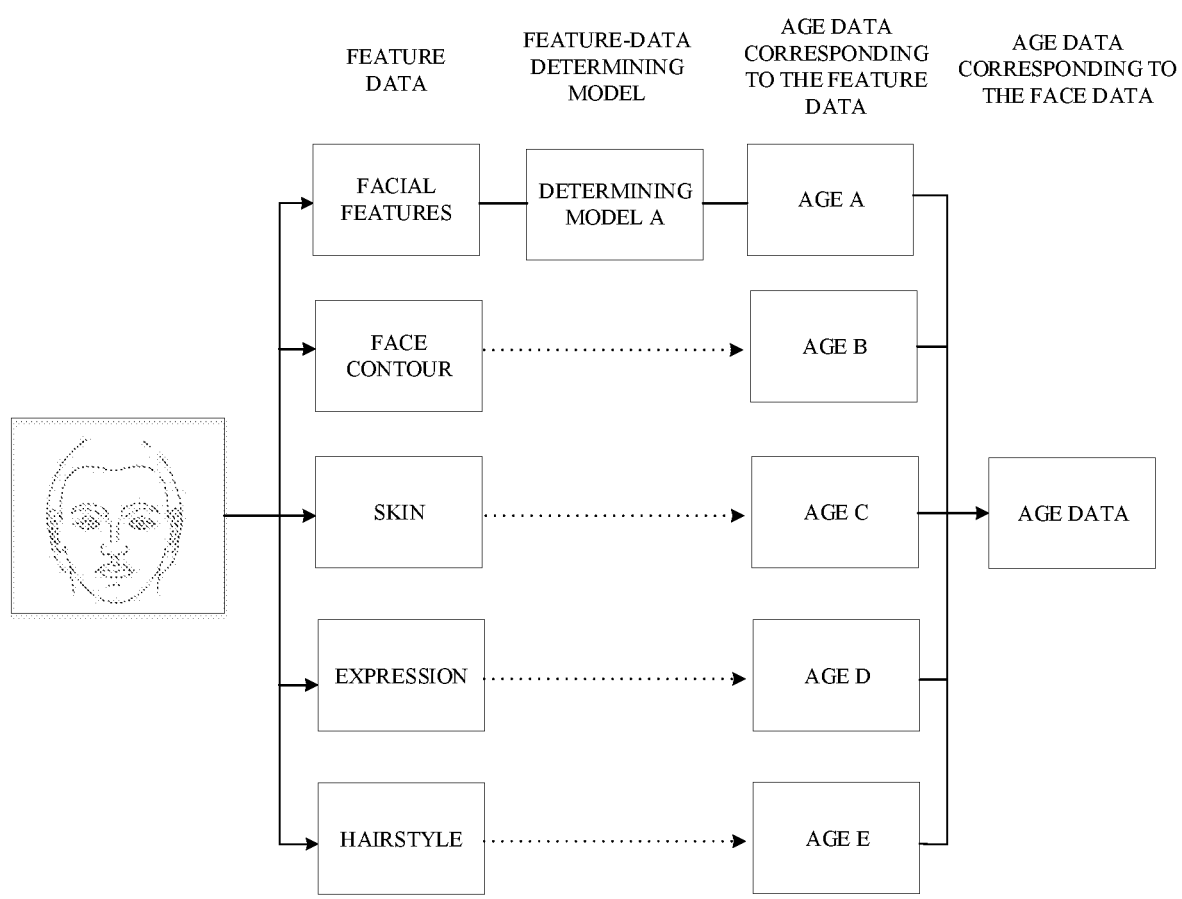
FIG. 3 is a block diagram illustrating performing age determination on derived face data according to embodiments.

FIG. 3 is a block diagram illustrating performing age determination on derived face data. As illustrated in FIG. 3, in an age determining model, there is a feature-data determining model (defined as "determining model A") configured to perform age determination on feature data about facial features. In a process of performing age determination on the derived face data, feature data about facial features (defined as "facial feature") is extracted from the derived face data. When an age of "facial feature" needs to be determined, a system determines the age of "facial feature" through "determining model A" by default, and obtains age data (defined as "age A") corresponding to "facial feature". In addition to performing age determination on the feature data about facial features (i.e., "facial feature") to obtain the age data, age determination can also be performed on feature data about face contour, skin, expression, hairstyle, or the like. A process of performing age determination on the above types of feature data is similar to a process of performing age determination on the feature data about facial features, and accordingly, "age B", "age C", "age D", and "age E" (age data) are obtained respectively. When all age data determined through all the feature-data determining models in the age determining model is obtained, aggregate all the age data to obtain overall age data corresponding to the face data to-be-tested.

At block 205, determine whether a degree of correlation between the age distribution interval obtained by performing age determination on each of the multiple different derived face data in the first derived face data set and a first reference age interval is greater than a preset threshold.

According to embodiments, a degree of matching between the age distribution interval obtained and the first reference age interval is determined according to a degree of correlation (i.e., high correlation or low correlation). The determination of high correlation or low correlation can be known through an algorithm. For example, a ratio of an overlap portion of the two intervals to an entire range is determined as a parameter for comparison to determine the degree of correlation. As such, when the ratio is greater than a preset threshold, determine that the age distribution interval obtained matches the first reference age interval. For another example, by calculating a difference between the median of the age distribution interval generated and the median of the first reference age interval combined with other factors, the degree of correlation between the two intervals can be determined. When the degree of correlation is greater than a preset threshold, determine that the age distribution interval obtained matches the first reference age interval. It should be understood that, the calculation of the degree of correlation and the value of the preset threshold may vary according to different algorithms, which is mainly to define the degree of matching of the two distribution intervals according to a specific value.

In some embodiments, if the degree of correlation is greater than the preset threshold, age data corresponding to the face data to-be-tested is obtained according to the age distribution interval.

At block 206, when the degree of correlation is greater than the preset threshold, age median data corresponding to the age distribution interval is obtained according to the age distribution interval for example.

At block 207, the age median data is used as the age data corresponding to the face data to-be-tested.

In some embodiments, the age distribution interval is generated according to association between face features corresponding to different ages on the basis of aging or rejuvenation by a certain age between two adjacent derived face data. In this case, if the age distribution interval matches the first reference age interval, the median or average of two endpoints (i.e., maximum value and minimum value) of the age distribution interval generated is used as the age data corresponding to the face data to-be-tested.

As an example, the age distribution interval generated by performing age determination on derived face data in the first derived face data set is 25-29 years old, and derived face data in the first derived face data set is generated by performing aging or rejuvenation (process) on the face data to-be-tested in terms of a specific age based on association between face features corresponding to different ages. If the number of derived face data obtained after aging process is the same as the number of derived face data obtained after rejuvenation process, and a difference between ages corresponding to any two adjacent derived face data of the first derived face data set is the same, the median of the distribution interval is considered to have the best match with the actual age.

At 208, if the degree of correlation is less than the preset threshold, endpoint values of the age distribution interval are adjusted, until the age distribution interval matches the first reference age interval.

When the degree of correlation is low, the age distribution interval does not match the first reference age interval. In this case, the endpoint values of the age distribution interval are adjusted, until the age distribution interval matches the first reference age interval. In some embodiments, values of age distribution of the age distribution interval may be adjusted (e.g., increasing or decreasing), and the comparison is performed again. The median of the age distribution interval adjusted is output when a matching condition is satisfied.

The age distribution interval is used to represent age data corresponding to the multiple derived face data. With the representation of the age distribution interval, a fault tolerance rate in performing age determination can be effectively improved. In addition, accurate age data corresponding to the face data to-be-tested can be obtained according to the age distribution interval, and therefore, accuracy of age determination performed on the face data to-be-tested can be improved.

Figure 4:
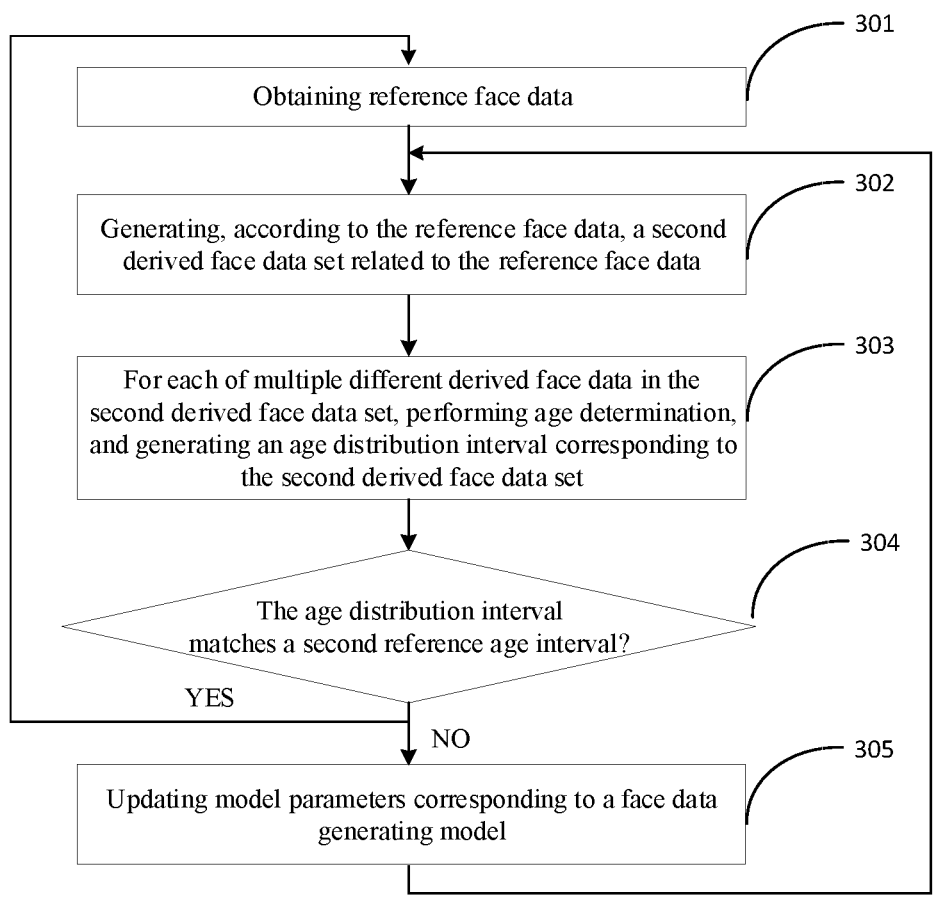
FIG. 4 is a schematic flowchart illustrating training a face data generating model according to embodiments.

FIG. 4 is a schematic flowchart illustrating training a face data generating model according to embodiments. For convenience of description, only parts related to the embodiments are illustrated.

FIG. 4 illustrates a method for training a face data generating model (i.e., a generator), based on a GAN.

At block 301, reference face data is obtained.

At block 302, a second derived face data set related to the reference face data is generated according to the reference face data, where the second derived face data set includes multiple different derived face data.

At block 303, for each of the multiple different derived face data in the second derived face data set, age determination is performed, and an age distribution interval corresponding to the second derived face data set is generated.

At block 304, whether the age distribution interval corresponding to the second derived face data set matches a second reference age interval is determined.

At block 305, upon determining that the age distribution interval corresponding to the second derived face data set does not match the second reference age interval, model parameters of the face data generating model are updated, until the age distribution interval corresponding to the second derived face data set and obtained by performing age determination on each of the multiple different derived face data in the second derived face data set matches the second reference age interval.

In some embodiments, the reference face data is obtained from an AFAD database, an AFLW database, or some other commercial face database which can provide sufficient reference face data, so that the confidence of reference information is sufficiently high.

For details of the process of generating the second derived face data set, reference can be made to the operations at block 102 described in conjunction with in FIG. 1. The principle and the process of generating the second derived face data set are basically the same as those of generating the first derived face data set. The main difference is that the second derived face data set is generated according to reference face data in face database while the first derived face data set is generated according to the face data to-be-tested. For the convenience of description, it will not be repeated herein.

In some embodiments, whether the age distribution interval corresponding to the second derived face data set matches the second reference age interval can be determined by introducing a concept of accuracy rate. A result of each match (i.e., a successful match or an unsuccessful match) during training of a generator is counted to determine accuracy rate of multiple matches. If the accuracy rate of multiple matches is sufficiently high (i.e., a value of the accuracy rate is great enough), the generator is determined to be sufficiently reliable. For instance, matching accuracy rate per unit time is required to be more than 98%. In this way, if the matching accuracy rate of a generating model (i.e., a generator) in the training process reaches the value (i.e., 98%), the training can be suspended.

When the matching accuracy rate between the age distribution interval corresponding to the second derived face data set generated and the second reference age interval is lower than a preset matching accuracy rate, determine that model parameters of a generating model (i.e., a generator) used for generating derived face data based on face data have insufficient confidence. In this case, the model parameters are adjusted according to the second reference age interval until an age distribution interval corresponding to derived face data regenerated matches the second reference age interval. GAN-based training of the generator is continuously performed based on different reference face data with the following training process: obtaining reference face data, generating multiple derived face data, matching failure, parameter update, re-generating multiple derived face data, and matching. In addition, matching is performed with multiple derived face data generated, which can effectively increase the number of training samples, thereby improving efficiency of training of the generator during the training, achieving a better training effect, and enabling the generating model (i.e., the generator) to reach high confidence.

Figure 5:
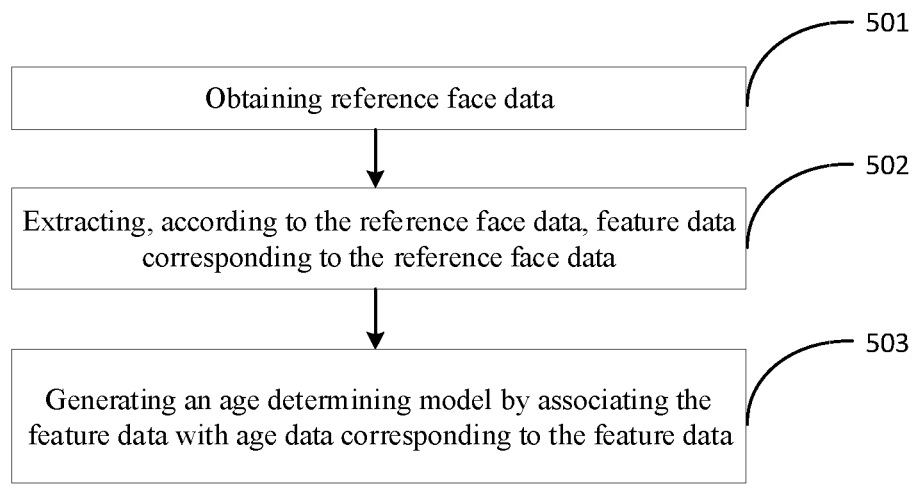
FIG. 5 is a schematic flowchart illustrating obtaining an age determining model according to embodiments.

FIG. 5 is a schematic flowchart illustrating obtaining an age determining model. In some embodiments, the age determining model is obtained as follows.

At block 501, reference face data is obtained, where the reference face data includes age data.

At block 502, feature data corresponding to the reference face data is extracted according to the reference face data.

At block 503, the age determining model is generated by associating the feature data with the age data corresponding to the feature data.

According to the above operations, a model for mapping a relationship between feature data and corresponding age data can be generated by associating the feature data with the age data corresponding to the feature data. As such, for different feature data, the age determining model can determine age data corresponding to the feature data based on the relationship between feature data and corresponding age data. In practice, the manner of association depends on a specific situation.

In some embodiments, when performing feature data extraction, a device obtains feature data from face data by deep learning and a convolutional neural network, to improve accuracy of the feature data obtained.

In some embodiments, the age determining model is generated by associating multiple feature-data determining models according to preset weights. Considering that accuracy of age determination performed by the age determining model on feature data of different types is different and feature data of different types has different effects on overall age determination, when weights are configured, the weights can be adjusted according to the above factors. As such, accuracy of the age data obtained based on the age determining model is improved.

Finally, an age distribution interval is generated according to multiple obtained age data corresponding to different derived face data. For example, if age data corresponding to derived face data in the first derived face data set has the greatest value, for example, 30 years old, and age data corresponding to another derived face data in the first derived face data set has the smallest value, for example, 25 years old, based on a result of the two age data (i.e., two ends), it can be determined that the age distribution interval corresponding to the first derived face data set is 25-30 years old.

The number of derived face data and a manner of division of the interval can be adjusted according to an actual application scenario. According to the above manner, the derived face data for detection related to the face data to-be-tested can be effectively expanded, and therefore a fault tolerance rate of face age recognition can be improved based on the generated derived face data. As such, accuracy of age determination can be improved.

According to embodiments, the face data generating model (i.e., the generator) can be obtained based on the GAN. Specifically, the second derived face data set is obtained through the generator based on the reference face data, and accuracy of the second derived face data set is determined based on the second reference age interval, to optimize the generator, thereby making the generator reliable. Then, the first derived face data set related to the face data to-be-tested is generated through the face data generating model (i.e., the generator). Age determination is performed on each of the multiple derived face data in the first derived face data set based on the trained age determining model. After age determination is performed, aggregate age data and generate the age distribution interval, and then age data having a high degree of matching with the face data to-be-tested is obtained according to the age distribution interval. In this way, the problem of poor recognition accuracy due to an unsatisfactory image angle, overexposure, or darkness can be effectively solved in a process of determining an age corresponding to the face data to-be-tested, thereby improving a fault tolerance rate of algorithms in age determination. As such, face age recognition algorithms can be dynamically applicable to various environments and accuracy of face age recognition can be greatly improved.

According to embodiments, a device for face recognition is further provided. The device for face recognition includes a first obtaining unit, a first generating unit, a first determining unit, a first judging unit, and a second obtaining unit. The first obtaining unit is configured to obtain face data to-be-tested. The first generating unit is configured to generate, according to the face data to-be-tested, a first derived face data set related to the face data to-be-tested, where the first derived face data set includes multiple different derived face data. The first determining unit is configured to, for each of the multiple different derived face data in the first derived face data set, perform age determination, and generate an age distribution interval corresponding to the first derived face data set. The first judging unit is configured to determine whether the age distribution interval matches a first reference age interval. The second obtaining unit is configured to obtain, according to the age distribution interval, age data corresponding to the face data to-be-tested, when the age distribution interval matches the first reference age interval.

In some embodiments, the device for face recognition includes the first obtaining unit, the first generating unit, the first determining unit, the first judging unit, and the second obtaining unit. The first obtaining unit is configured to obtain face data to-be-tested. The first generating unit is configured to generate, according to the face data to-be-tested, a first derived face data set related to the face data to-be-tested, where the first derived face data set includes multiple different derived face data. The first determining unit is configured to, for each of the multiple different derived face data in the first derived face data set, perform age determination, and generate an age distribution interval corresponding to the first derived face data set. The first judging unit is configured to determine whether the age distribution interval matches a first reference age interval. The second obtaining unit is configured to obtain, according to the age distribution interval, age data corresponding to the face data to-be-tested, when the age distribution interval matches the first reference age interval.

In some embodiments, the first generating unit includes a first generating sub-unit. The first generating sub-unit is configured to generate, according to the face data to-be-tested, the first derived face data set related to the face data to-be-tested based on a predetermined face data generating model.

In some embodiments, the device for face recognition further includes a third obtaining unit, a second generating unit, a second determining unit, a second judging unit, and an updating unit. The third obtaining unit is configured to obtain reference face data. The second generating unit is configured to generate, according to the reference face data, a second derived face data set related to the reference face data, where the second derived face data set includes multiple different derived face data. The second determining unit is configured to perform age determination for each of the multiple different derived face data in the second derived face data set and generate an age distribution interval corresponding to the second derived face data set. The second judging unit is configured to determine whether the age distribution interval corresponding to the second derived face data set matches a second reference age interval. The updating unit is configured to update model parameters of the face data generating model when the age distribution interval corresponding to the second derived face data set does not match the second reference age interval, until the age distribution interval corresponding to the second derived face data set and obtained by performing age determination on each of the multiple different derived face data in the second derived face data set matches the second reference age interval.

In some embodiments, the first determining unit includes a first determining sub-unit. The first determining sub-unit is configured to, for each of the multiple different derived face data in the first derived face data set, determine an age corresponding thereto based on a predetermined age determining model and generate the age distribution interval corresponding to the first derived face data set. The age determining model is configured to extract feature data from the derived face data and determine age data corresponding to the feature data.

In some embodiments, the age determining model includes multiple feature-data determining models, and each of the multiple feature-data determining models is configured to determine feature data of a preset type and obtain, according to the feature data of the preset type, age data corresponding to the feature data of the preset type.

In some embodiments, the first determining unit further includes a first obtaining sub-unit, an extracting sub-unit, and a first generating sub-unit. The first obtaining sub-unit is configured to obtain reference face data, where the reference face data includes age data. The extracting sub-unit is configured to extract, according to the reference face data, feature data corresponding to the reference face data. The first generating sub-unit is configured to generate the age determining model by associating the feature data with the age data corresponding to the feature data.

In some embodiments, the feature data is obtained from face data by deep learning and a convolutional neural network.

In some embodiments, the age determining model is generated by associating multiple feature-data determining models according to preset weights.

In some embodiments, the first judging unit includes a first judging sub-unit. The first judging sub-unit is configured to determine whether a degree of correlation between the age distribution interval obtained by performing age determination on each of the multiple different derived face data in the first derived face data set and the first reference age interval is greater than a preset threshold. The second obtaining unit includes a second obtaining sub-unit and an adjusting sub-unit. The second obtaining sub-unit is configured to obtain, according to the age distribution interval, the age data corresponding to the face data to-be-tested, when the degree of correlation is greater than the preset threshold. The adjusting sub-unit is configured to adjust endpoint values of the age distribution interval when the degree of correlation is less than the preset threshold, until the age distribution interval matches the first reference age interval.

In some embodiments, the first generating unit includes a second generating sub-unit and a third generating sub-unit. The second generating sub-unit is configured to perform face aging and face rejuvenation on the face data to-be-tested in terms of different preset ages, and generate the multiple derived face data which represent different ages and are related to the face data to-be-tested. The third generating sub-unit is configured to obtain the first derived face data set by distributing the multiple derived face data continuously according to ages corresponding to the multiple derived face data.

In some embodiments, the second obtaining unit includes a third obtaining sub-unit and a confirming sub-unit. The third obtaining sub-unit is configured to obtain, according to a result of performing age determination on each of the multiple different derived face data in the first derived face data set, age median data corresponding to the age distribution interval of the first derived face data set obtained by distributing the multiple derived face data continuously. The confirming sub-unit is configured to use the age median data as the age data corresponding to the face data to-be-tested.

Figure 6:
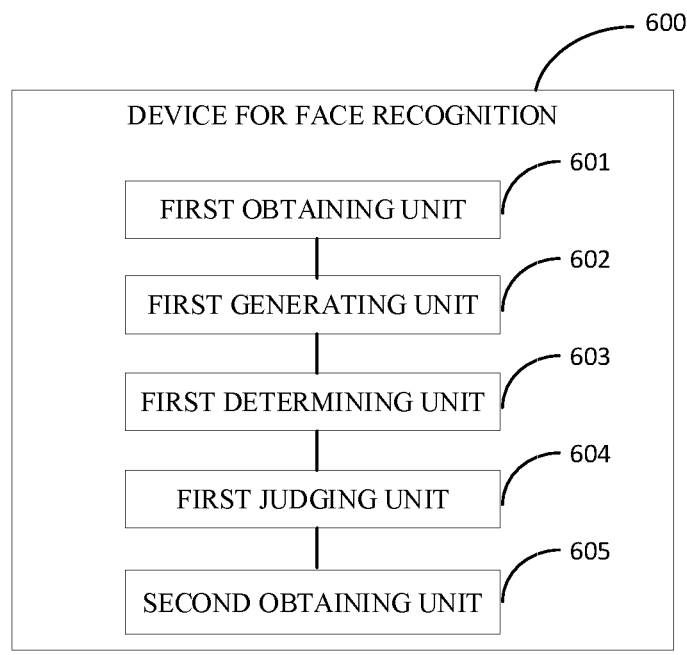
FIG. 6 is a schematic structural diagram illustrating a device for face recognition according to embodiments.

FIG. 6 illustrates a structure of a device for face recognition according to embodiments. The device includes a first obtaining unit 601, a first generating unit 602, a first determining unit 603, a first judging unit 604, and a second obtaining unit 605 which are configured to execute the following operations.

The first obtaining unit 601 is configured to obtain face data to-be-tested.

In some embodiments, face data may be in a form of a data set, an image, or the like related to a face. The face data to-be-tested may be obtained by confirming in an electronic device through manual input or manual selection, or may be obtained through selection and extraction by means of preset programs.

As an example, by means of an application of a mobile phone, an image having a face in an image set of the mobile phone can be selected, such that the image selected can be determined as the face data to-be-tested. As another example, for an image having multiple faces, a position of each of the multiple faces in the image can be determined by a face detection algorithm, and then face data desired can be extracted according to the position of each of the multiple faces in the image. The above examples are for illustrative purposes only, and should not be understood as limitation of the manner in which the face data to-be-tested of the disclosure is obtained. In practice, the face data to-be-tested can be obtained in various manners.

For ease of description, in the following embodiments, the face data is illustrated in a form of an image.

The first generating unit 602 is configured to generate, according to the face data to-be-tested, a first derived face data set related to the face data to-be-tested, where the first derived face data set includes multiple different derived face data.

In some embodiments, the first derived face data set can be generated according to the face data to-be-tested, and the first derived face data set includes multiple different derived face data corresponding to the face data to-be-tested. In a generating process, derived face data of the first derived face data set may be generated by adopting feature data-based generation method or other manners. It may be understood that, if derived face data is generated by adopting the feature data-based generation method, features corresponding to derived face data will be the same as or similar to features corresponding to the face data to-be-tested, or features corresponding to derived face data will be varied in an expected manner.

For example, if the first derived face data set is generated by adopting feature data-based generation method, a system extracts feature data concerning face contour, facial features, skin, expression, hairstyle, and so on from the face data to-be-tested, and then derived face data corresponding to the feature data extracted is generated according to some face-feature association rules (e.g., association between faces corresponding to different ages or different regions) summarized from a face database.

In the following, a generating process based on facial features in the feature data is taken as an example for illustration. A system extracts feature data concerning the facial features (or can be referred to as "facial feature A") from the face data to-be-tested. In a process of generating the first derived face data set, according to association between features corresponding to different ages, feature data concerning the facial features (or can be referred to as "face-feature $A_1$") is generated based on "facial feature A" varied at a certain age interval (e.g., aged by 2 years old), and "facial feature $A_1$" is then added to derived face data generated. It should be understood that, if a generating model (i.e., a generator) is reliable, a result obtained by performing age determination on newly generated derived face data based on certain feature data and a result obtained by performing age determination on the original face data to-be-tested based on the certain feature data should also differ by about 2 years old.

The above examples are merely described in conjunction with "facial feature A". Since a generating principle in terms of other types of feature data (where other types of feature data at least include face contour, skin, expression, hairstyle, etc.) is similar to a generating principle in terms of "facial feature A". To this end, for details of generating other types of feature data to be added to derived face data, reference can be made to the above examples. The various types of feature data may be synthesized according to some rules to achieve generation of the whole derived face data.

The number of the derived face data in the first derived face data set generated and the age distribution of the first derived face data set generated may be set according to actual needs. For instance, the first derived face data set includes ten derived face data, where derived face data in the first derived face data set are generated according to association between face features (that is, features of a face) corresponding to different ages on the basis of aging or rejuvenation of 0.5 year old between two adjacent derived face data. Specifically, obtain five derived face data, where ages corresponding to the five derived face data are aged by 0.5 year old, 1 year old, 1.5 years old, 2 years old, and 2.5 years old respectively, compared with an age corresponding to the original face data to-be-tested. Obtain another five derived face data, where ages corresponding to another five derived face data are younger by 0.5 year old, 1 year old, 1.5 years old, 2 years old, and 2.5 years old respectively, compared with the age corresponding to the original face data to-be-tested. The number of the derived face data obtained after aging process and the number of the derived face data obtained after rejuvenation process are the same. In this way, a first derived face data set which includes ten derived face data and corresponds to an age distribution interval of ±2.5 years old relative to an age of the face data to-be-tested is generated.

The first determining unit 603 is configured to perform, for each of the multiple different derived face data in the first derived face data set, age determination and generate an age distribution interval corresponding to the first derived face data set.

In some embodiments, age determination is performed on the multiple derived face data in the first derived face data set through a predetermined algorithm. As an example, if the first derived face data set includes ten derived face data, in a process of performing age determination, ten age data can be obtained by performing age determination on each of the ten derived face data.

Then, the age distribution interval is generated according to the ten age data. As an example, if age data corresponding to derived face data in the first derived face data set has the greatest value, for example, 30 years old, and age data corresponding to another derived face data in the first derived face data set has the smallest value, for example, 25 years old, based on a result of the two age data (i.e., two ends), it can be determined that the age distribution interval corresponding to the first derived face data set is 25-30 years old.

The number of derived face data and a manner of division of the interval can be adjusted according to a practical situation. According to the above manner, the derived face data for detection related to the face data to-be-tested can be effectively expanded, and as such, a fault tolerance rate of face age recognition can be improved based on the generated derived face data, thereby improving accuracy of age determination.

The first judging unit 604 is configured to determine whether the age distribution interval matches a first reference age interval.

In some embodiments, the first reference age interval may be obtained by performing age determination according to the face data to-be-tested based on a preset face database. The face database may be an AFAD database, an AFLW database, or some other commercial face database which can provide sufficient reference face data, so that the confidence of reference information is sufficiently high.

In a matching process, the age distribution interval generated by performing age determination on each of the multiple different derived face data in the first derived face data set is compared with the first reference age interval. For example, median data, average data, endpoint data, or other data of the age distribution interval generated and the first reference age interval may be obtained for comparison. A difference of data obtained from the two intervals is obtained. Whether the difference is smaller than a preset threshold is determined. If the difference is smaller than the preset threshold, determine that the age distribution interval generated matches the first reference age interval. Otherwise, determine that the age distribution interval generated does not match the first reference age interval. Certainly, a specific judgment condition may be set according to specific needs, which is not limited herein.

As an example, the age distribution interval generated by performing age determination on each of the multiple different derived face data in the first derived face data set is 25-29 years old, and the first reference age interval obtained according to the face data to-be-tested based on a face database is 27-31 years old. In order to determine a degree of matching of the age distribution interval generated and the first reference age interval obtained, a difference between the median of the age distribution interval generated and the median of the first reference age interval obtained is calculated. Based on the above, the median of the age distribution interval corresponding to the first derived face data set is 27 (i.e., (25+29)/2=27), and the median of the first reference age interval is 29 (i.e., (27+31)/2=29). If an acceptable difference range is ±3, and a result of subtracting 27 from 29 is less than 3 (i.e., 29−27<3), determine that the age distribution interval corresponding to the first derived face data set matches the first reference age interval obtained based on the face database. Then the median is selected from the age distribution interval as age data corresponding to the face data to-be-tested. If the acceptable difference range is ±1, determine that the age distribution interval corresponding to the first derived face data set does not match the first reference age interval obtained based on the face database. In some embodiments, values of age distribution of the age distribution interval may be adjusted (e.g., increasing or decreasing), and the comparison is performed again. The median of the age distribution interval adjusted is output when a matching condition is satisfied. By generating the first derived face data set according to the face data to-be-tested and performing age determination on each of the multiple derived face data in the first derived face data set, the problem of large deviations in age determination caused by strong light or weak light during shooting can be effectively avoided, which improves accuracy of face age recognition.

The second obtaining unit 605 is configured to obtain, according to the age distribution interval, age data corresponding to the face data to-be-tested, when the age distribution interval matches the first reference age interval.

In some embodiments, the age distribution interval is obtained according to association between face features (that is, features of a face) corresponding to different ages on the basis of aging or rejuvenation by a certain age between two adjacent derived face data. In this case, if the age distribution interval matches the first reference age interval, the median or average of two endpoints (i.e., maximum value and minimum value) of the age distribution interval generated is used as the age data corresponding to the face data to-be-tested. If the age distribution interval is generated in other manners, the age data corresponding to the face data to-be-tested may also be obtained according to other age values in the age distribution interval.

As an example, the age distribution interval generated by performing age determination on derived face data in the first derived face data set is 25-29 years old, and derived face data in the first derived face data set is generated by performing aging or rejuvenation (process) on the face data to-be-tested in terms of a specific age based on association between face features corresponding to different ages. Specifically, ages corresponding to five derived face data are aged by 0.5 year old, 1 year old, 1.5 years old, 2 years old, and 2.5 years old (compared with an age corresponding to the original face data to-be-tested) respectively. Ages corresponding to another five derived face data are younger by 0.5 year old, 1 year old, 1.5 years old, 2 years old, and 2.5 years old (compared with the age corresponding to the original face data to-be-tested) respectively. The number of the derived face data obtained after aging process and the number of the derived face data obtained after rejuvenation process are the same, and as such, ten derived face data are obtained in total. The age data corresponding to the face data to-be-tested can be the median of the age distribution interval of 25-29 years old (i.e., (25+29)/2=27 years old). In this way, accurate age data corresponding to the face data to-be-tested can be obtained according to the age distribution interval.

According to embodiments, the first obtaining unit 601 is configured to obtain the face data to-be-tested. The first generating unit 602 is configured to generate the first derived face data set (where the first derived face data set includes multiple different derived face data) related to the face data to-be-tested according to the face data to-be-tested, to expand face-data samples related to the face data to-be-tested based on the first derived face data set. The first determining unit 603 is configured to perform age determination on each of the multiple different derived face data in the first derived face data set and generate the age distribution interval corresponding to the first derived face data set. The age distribution interval is obtained by performing age determination based on the first derived face data set, which can widen a value of a certain point to values distributed in a certain distribution interval, thereby improving a fault tolerance rate of face age determination. In addition, the first judging unit 604 is configured to determine whether the age distribution interval matches the first reference age interval. The second obtaining unit 605 is configured to obtain the age data corresponding to the face data to-be-tested according to the age distribution interval if the matching is successful. According to the foregoing face recognition method, the age distribution interval generated according to the face data to-be-tested can be obtained, and the age data corresponding to the face data to-be-tested can be determined according to the age distribution interval. In this way, the problem of poor recognition accuracy due to an inappropriate image angle, overexposure, or darkness can be effectively solved in determining an age corresponding to the face data to-be-tested, thereby improving a fault tolerance rate of algorithms in age determination. As such, face age recognition algorithms can be dynamically applicable to various environments and accuracy of face age recognition can be greatly improved.

Figure 7:
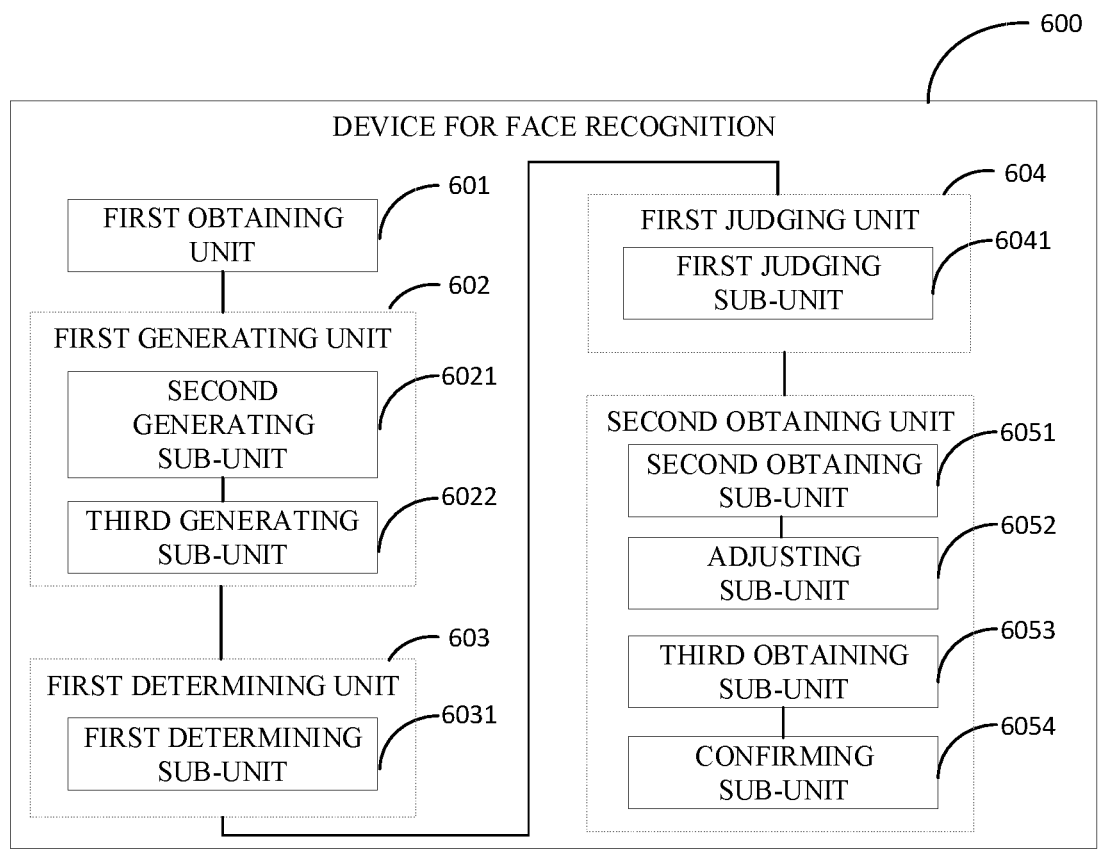
FIG. 7 is a schematic structural diagram illustrating a device for face recognition according to other embodiments.

FIG. 7 illustrates a structure of a device for face recognition according to other embodiments. As illustrated in FIG. 7, the device for face recognition includes a first obtaining unit 601, a first generating unit 602, a first determining unit 603, a first judging unit 604, and a second obtaining unit 605.

The first obtaining unit 601 is configured to obtain face data to-be-tested.

In some embodiments, face data may be in a form of a data set, an image, or the like related to a face. The face data to-be-tested may be obtained by confirming in an electronic device through manual input or manual selection, or may be obtained through selection and extraction by means of preset programs.

As an example, by means of an application of a mobile phone, an image having a face in an image set of the mobile phone can be selected, and as such the image selected can be determined as the face data to-be-tested. As another example, for an image having multiple faces, a position of each of the multiple faces in the image can be determined by a face detection algorithm, and then face data desired can be extracted according to the position of each of the multiple faces in the image. The above examples are for merely illustrative, and should not be understood as limitation of the manner in which the face data to-be-tested of the disclosure is obtained. In practice, there can be various manners in which the face data to-be-tested is obtained.

In some embodiments, a first derived face data set related to the face data to-be-tested is generated according to the face data to-be-tested based on a predetermined face data generating model, where the first derived face data set includes multiple different derived face data.

In some embodiments, the first generating unit 602 includes a second generating sub-unit 6021 and a third generating sub-unit 6022. The second generating sub-unit 6021 is configured to perform face aging and face rejuvenation on the face data to-be-tested in terms of different preset ages and generate multiple derived face data which represent different ages and are related to the face data to-be-tested. The third generating sub-unit 6022 is configured to obtain a first derived face data set by distributing the multiple derived face data sequentially according to ages corresponding to the multiple derived face data, where the first derived face data set includes the multiple different derived face data.

In some embodiments, the first derived face data set can be generated according to the face data to-be-tested, and the first derived face data set includes multiple different derived face data corresponding to the face data to-be-tested. In a process of generating the first derived face data set based a face data generating model, derived face data of the first derived face data set may be generated by adopting feature data-based generation method or other manners. It may be understood that, if derived face data is generated by adopting the feature data-based generation method, features corresponding to derived face data will be identical with or similar to features corresponding to the face data to-be-tested, or features corresponding to derived face data will be varied in an expected manner.

If the first derived face data set is generated by adopting feature data-based generation method, a system extracts feature data concerning face contour, facial features, skin, expression, hairstyle, and so on from the face data to-be-tested, and then derived face data corresponding to the feature data extracted is generated according to some face-feature association rules (e.g., association between faces corresponding to different ages or different regions) summarized from a face database.

In the following, take a generating process based on facial features in the feature data as an example for illustration. A system extracts feature data concerning the facial features (or can be referred to as "facial feature A") from the face data to-be-tested. In a process of generating the first derived face data set, according to association between features corresponding to different ages, feature data concerning the facial features (or can be referred to as "facial feature $A_1$") is generated based on "facial feature A" varied at a certain age interval (e.g., aged by 2 years old), and "facial feature $A_1$" is then added to derived face data generated. It should be understood that, if a generating model is reliable, a result obtained by performing age determination on newly generated derived face data based on certain feature data and a result obtained by performing age determination on the original face data to-be-tested based on the certain feature data should also differ by about 2 years old.

The above examples are merely described in conjunction with "facial feature A". Since a generating principle based on other types of feature data (where other types of feature data at least include face contour, skin, expression, hairstyle, etc.) is similar to a generating principle based on "facial feature A". To this end, for details of generating other types of feature data to be added to derived face data, reference can be made to the above examples. The various types of feature data may be synthesized according to some rules to implement generation of the whole derived face data.

The number of the derived face data in the first derived face data set generated and the age distribution of the first derived face data set generated may be set according to actual needs. For instance, the first derived face data set includes ten derived face data, where derived face data in the first derived face data set are generated based on association between face features (that is, features of a face) corresponding to different ages and two adjacent derived face data have a difference of 0.5 year old aging or rejuvenation. Specifically, obtain five derived face data, where ages corresponding to the five derived face data are aged by 0.5 year old, 1 year old, 1.5 years old, 2 years old, and 2.5 years old respectively, compared with an age corresponding to the original face data to-be-tested. Obtain another five derived face data, where ages corresponding to another five derived face data are younger by 0.5 year old, 1 year old, 1.5 years old, 2 years old, and 2.5 years old respectively, compared with the age corresponding to the original face data to-be-tested. The number of the derived face data obtained after aging process and the number of the derived face data obtained after rejuvenation process are the same. In this way, a first derived face data set which includes ten derived face data and corresponds to an age distribution interval of ±2.5 years old relative to an age of the face data to-be-tested is generated.

In some embodiments, in order to improve the confidence of the first derived face data set generated through a face data generating model (i.e., a generator), the generator can be trained by introducing a GAN.

The first determining unit 603 includes a first determining sub-unit 6031. The first determining sub-unit 6031 is configured to, for each of the multiple different derived face data in the first derived face data set, determine an age corresponding thereto based on a predetermined age determining model (where the age determining model is configured to extract feature data from the derived face data and determine age data corresponding to the feature data), and generate an age distribution interval corresponding to the first derived face data set.

In addition, the age determining model includes multiple feature-data determining models. Each of the multiple feature-data determining models is configured to determine feature data of a preset type and obtain, according to the feature data of the preset type, age data corresponding to the feature data of the preset type. It should be understood that, each feature-data determining model is configured to provide an age determination result based on feature data corresponding to the feature-data determining model.

In an age determining model, there is a feature-data determining model (defined as "determining model A") configured to perform age determination on feature data concerning facial features. In a process of performing age determination on the derived face data, feature data about facial features (defined as "facial feature") is extracted from the derived face data. When an age of "facial feature" needs to be determined, a system determines the age of "facial feature" through "determining model A" by default, and obtains age data (defined as "age A") corresponding to "facial feature". In general, in addition to obtaining the age data by performing age determination on the feature data about facial features (i.e., "facial feature"), additional age data can also be obtained by performing age determination on feature data about face contour, skin, expression, hairstyle, or the like. When all age data determined through all the feature-data determining models in the age determining model is obtained, aggregate all the age data to obtain overall age data corresponding to the face data to-be-tested.

The first judging unit 604 includes a first judging sub-unit 6041. The first judging sub-unit 6041 is configured to determine whether a degree of correlation between the age distribution interval obtained by performing age determination on each of the multiple different derived face data in the first derived face data set and a first reference age interval is greater than a preset threshold.

According to embodiments, a degree of matching between the age distribution interval obtained and the first reference age interval is determined according to a degree of correlation (i.e., high correlation or low correlation). The determination of high correlation or low correlation can be known through an algorithm. For example, a ratio of an overlap portion of the two intervals to an entire range is determined as a parameter for comparison to determine the degree of correlation. In this way, when the ratio is greater than a preset threshold, determine that the age distribution interval obtained matches the first reference age interval. For another example, by calculating a difference between the median of the age distribution interval generated and the median of the first reference age interval combined with other factors, the degree of correlation between the two intervals can be determined. When the degree of correlation is greater than a preset threshold, determine that the age distribution interval obtained matches the first reference age interval. It should be understood that, the calculation of the degree of correlation and the value of the preset threshold may vary according to different algorithms, which is mainly to define the degree of matching of the two distribution intervals according to a specific value.

In some embodiments, the second obtaining unit 605 includes a second obtaining sub-unit 6051 and an adjusting sub-unit 6052. The second obtaining sub-unit 6051 is configured to obtain, according to the age distribution interval, age data corresponding to the face data to-be-tested, when the degree of correlation is greater than the preset threshold. The adjusting sub-unit 6052 is configured to adjust endpoint values of the age distribution interval when the degree of correlation is less than the preset threshold, until the age distribution interval matches the first reference age interval.

In some embodiments, the second obtaining unit 605 includes a third obtaining sub-unit 6053 and a confirming sub-unit 6054. The third obtaining sub-unit 6053 is configured to obtain, according to a result of performing age determination on each of the multiple different derived face data in the first derived face data set, age median data corresponding to the age distribution interval of the first derived face data set obtained by distributing the multiple derived face data sequentially. The confirming sub-unit 6054 is configured to use the age median data as the age data corresponding to the face data to-be-tested.

In some embodiments, the age distribution interval is obtained according to association between face features corresponding to different ages on the basis of aging or rejuvenation by a certain age between two adjacent derived face data. In this case, if the age distribution interval matches the first reference age interval, the median or average of two endpoints (i.e., maximum value and minimum value) of the age distribution interval generated is used as the age data corresponding to the face data to-be-tested.

As an example, the age distribution interval generated by performing age determination on derived face data in the first derived face data set is 25-29 years old, and derived face data in the first derived face data set is generated by performing aging or rejuvenation (process) on the face data to-be-tested in terms of a specific age based on association between face features corresponding to different ages. If the number of derived face data obtained after aging process is the same as the number of derived face data obtained after rejuvenation process, and a difference between ages corresponding to any two adjacent derived face data of the first derived face data set is the same, the median of the distribution interval is considered to have the best match with the actual age.

When the degree of correlation is low, the age distribution interval does not match the first reference age interval. In this case, the endpoint values of the age distribution interval are adjusted, until the age distribution interval matches the first reference age interval. In some embodiments, values of age distribution of the age distribution interval may be adjusted (e.g., increasing or decreasing), and the comparison is performed again. The median of the age distribution interval adjusted is output when a matching condition is satisfied.

The age distribution interval is used to represent age data corresponding to the multiple derived face data. With the representation of the age distribution interval, a fault tolerance rate in a process of performing age determination can be effectively improved. In addition, accurate age data corresponding to the face data to-be-tested can be obtained according to the age distribution interval, and therefore, accuracy of age determination performed on the face data to-be-tested can be improved.

Figure 8:
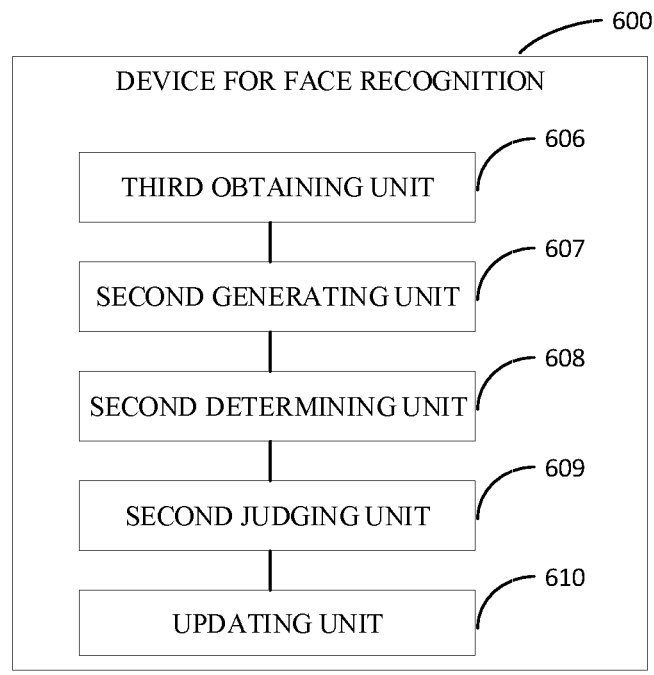
FIG. 8 is a schematic structural diagram illustrating a device for face recognition according to other embodiments.

FIG. 8 illustrates a device for face recognition which is configured to train a face data generating model (i.e., a generator) based on a GAN. The device for face recognition includes a third obtaining unit 606, a second generating unit 607, a second determining unit 608, a second judging unit 609, and an updating unit 610. The third obtaining unit 606 is configured to obtain reference face data. The second generating unit 607 is configured to generate, according to the reference face data, a second derived face data set related to the reference face data, where the second derived face data set includes multiple different derived face data. The second determining unit 608 is configured to perform age determination for each of the multiple different derived face data in the second derived face data set and generate an age distribution interval corresponding to the second derived face data set. The second judging unit 609 is configured to determine whether the age distribution interval corresponding to the second derived face data set matches a second reference age interval. The updating unit 610 is configured to update model parameters of the face data generating model when the age distribution interval corresponding to the second derived face data set does not match the second reference age interval, until the age distribution interval corresponding to the second derived face data set and obtained by performing age determination on each of the multiple different derived face data in the second derived face data set matches the second reference age interval.

In some embodiments, the reference face data is obtained from an AFAD database, an AFLW database, or some other commercial face database which can provide sufficient reference face data, so that the confidence of reference information is sufficiently high.

For details of the process of generating the second derived face data set, reference can be made to the operations at block 102 described in conjunction with in FIG. 1. The principle and the process of generating the second derived face data set are basically the same as those of generating the first derived face data set. The main difference is that the second derived face data set is generated according to reference face data in face database while the first derived face data set is generated according to the face data to-be-tested. For the convenience of description, it will not be repeated herein.

In some embodiments, whether the age distribution interval corresponding to the second derived face data set matches the second reference age interval can be determined by introducing a concept of accuracy rate. A result of each match (i.e., a successful match or an unsuccessful match) during training of a face data generating model (i.e., a generator) is counted to determine accuracy rate of multiple matches. If the accuracy rate of multiple matches is sufficiently high (i.e., a value of the accuracy rate is great enough), the generator is determined to be sufficiently reliable. For instance, matching accuracy rate per unit time is required to be more than 98%. As such, if the matching accuracy rate of a generator in the training process reaches the value (i.e., 98%), the training can be suspended.

When the matching accuracy rate between the age distribution interval corresponding to the second derived face data set generated and the second reference age interval is lower than a preset matching accuracy rate, determine that model parameters of a generator used for generating derived face data based on face data have insufficient confidence. In this case, the model parameters are adjusted according to the second reference age interval until an age distribution interval corresponding to derived face data regenerated matches the second reference age interval. GAN-based training of the generator is continuously performed based on different reference face data with the following training process: obtaining reference face data, generating multiple derived face data, matching failure, parameter update, re-generating multiple derived face data, and matching. In addition, matching is performed with multiple derived face data generated, which can effectively increase the number of training samples, thereby improving efficiency of training of the generator during the training, achieving a better training effect, and enabling the generator to reach high confidence.

Figure 9:
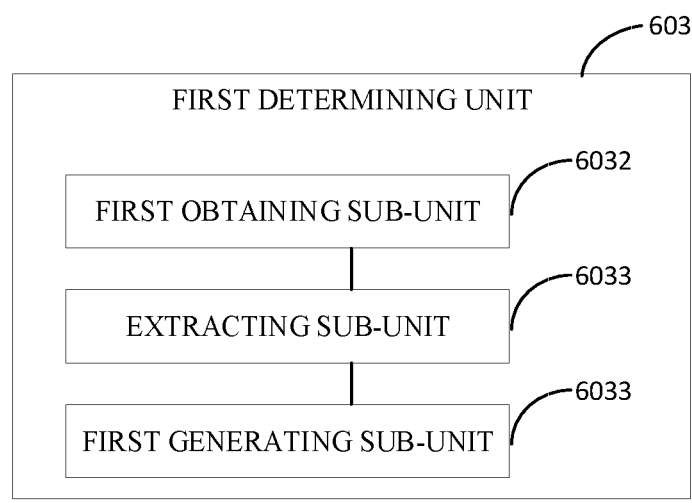
FIG. 9 is a schematic structural diagram illustrating a first determining unit according to embodiments.

FIG. 9 illustrates a structure of the first determining unit 603. The first determining unit 603 includes a first obtaining sub-unit 6032, an extracting sub-unit 6033, and a first generating sub-unit 6034. The first obtaining sub-unit 6032 is configured to obtain, with the third obtaining unit 606, reference face data, where the reference face data includes age data. The extracting sub-unit 6033 is configured to extract, with the second generating unit 607, feature data corresponding to the reference face data according to the reference face data. The first generating sub-unit 6034 is configured to generate the age determining model by associating the feature data with the age data corresponding to the feature data.

According to the above operations, a model for mapping a relationship between feature data and corresponding age data can be generated by associating the feature data with the age data corresponding to the feature data. As such, for different feature data, the age determining model can determine age data corresponding to the feature data based on the relationship between feature data and corresponding age data. In practice, the manner of association depends on a specific situation.

In some embodiments, when performing feature data extraction, the device obtains feature data from face data by deep learning and a convolutional neural network, to improve accuracy of the feature data obtained.

In some embodiments, the age determining model is generated by associating multiple feature-data determining models according to preset weights. Considering that accuracy of age determination performed by the age determining model on feature data of different types is different and feature data of different types has different effects on overall age determination, when weights are configured, the weights can be adjusted according to the above factors. As such, accuracy of the age data obtained through the age determining model can be improved.

Finally, an age distribution interval is generated according to multiple obtained age data corresponding to different derived face data. For example, if age data corresponding to derived face data in the first derived face data set has the greatest value, for example, 30 years old, and age data corresponding to another derived face data in the first derived face data set has the smallest value, for example, 25 years old, based on a result of the two age data (i.e., two ends), it can be determined that the age distribution interval corresponding to the first derived face data set is 25-30 years old.

The number of derived face data and a manner of division of the interval can be adjusted according to an actual application scenario. In addition, according to the above manner, the derived face data for detection related to the face data to-be-tested can be effectively expanded, and therefore a fault tolerance rate of face age recognition can be improved based on the generated derived face data. As such, accuracy of age determination can be improved.

According to embodiments, the face data generating model (i.e., the generator) can be obtained based on the GAN. Specifically, the second derived face data set is obtained through the face data generating model based on the reference face data, and accuracy of the second derived face data set is determined based on the second reference age interval, to optimize the generator, thereby making the generator reliable. Then, the first generating unit is configured to generate, with the generator, the first derived face data set related to the face data to-be-tested. The first determining unit is configured to perform, with the trained age determining model, age determination on feature data corresponding to each of the multiple derived face data in the first derived face data set. After age determination is performed, the first judging unit is configured to aggregate age data and generate the age distribution interval, and age data having a high degree of matching with the face data to-be-tested is obtained according to the age distribution interval. In this way, the problem of low recognition accuracy due to an unsatisfactory image angle, overexposure, or darkness can be effectively solved in a process of determining an age corresponding to the face data to-be-tested, thereby improving a fault tolerance rate of algorithms in performing age determination. As such, face age recognition algorithms can be dynamically applicable to various environments and accuracy of face age recognition can be greatly improved.

In some embodiments, an electronic device is further provided. The electronic device may be a smart phone, a tablet, a smart watch, or the like.

Figure 10:
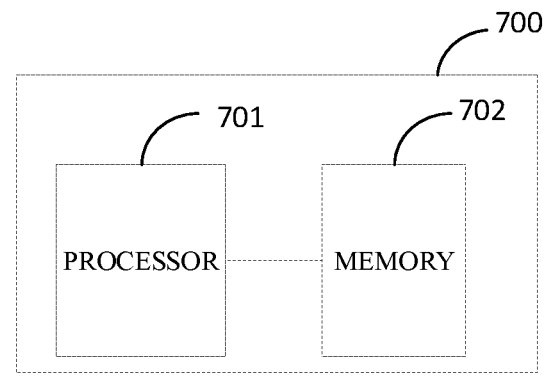
FIG. 10 is a schematic structural diagram illustrating an electronic device according to embodiments.

As illustrated in FIG. 10, in some embodiments, an electronic device 700 includes at least one processor 701 and a computer readable storage (e.g., a memory) 702. The processor 701 is electrically coupled with the memory 702 and is configured to control reading and writing of the memory 702.

The processor 701 is a control center of the electronic device 700. The processor 701 is configured to connect various parts of the entire electronic device 700 through various interfaces and lines, configured to execute various functions of the electronic device and process data by running or loading programs stored in the memory 702 and invoking data stored in the memory 702, thereby monitoring the electronic device 700 as a whole.

In this embodiment, the processor 701 of the electronic device 700 is configured to load instructions corresponding to processes of one or more programs into the memory 702 according to following operations, and to run programs stored in the memory 702, thereby implementing various functions. Face data to-be-tested is obtained. A first derived face data set related to the face data to-be-tested is generated according to the face data to-be-tested, where the first derived face data set includes multiple different derived face data. For each of the multiple different derived face data in the first derived face data set, age determination is performed, and an age distribution interval corresponding to the first derived face data set is generated. Whether the age distribution interval matches a first reference age interval is determined. Upon determining that the age distribution interval matches the first reference age interval, age data corresponding to the face data to-be-tested is obtained according to the age distribution interval.

In some embodiments, in terms of generating, according to the face data to-be-tested, the first derived face data set related to the face data to-be-tested, the processor 701 is configured to generate, according to the face data to-be-tested, the first derived face data set related to the face data to-be-tested based on a predetermined face data generating model.

In some embodiments, the processor 701 is further configured to operate as follows prior to generating, according to the face data to-be-tested, the first derived face data set related to the face data to-be-tested. The processor 701 is configured to obtain reference face data. The processor 701 is configured to generate, according to the reference face data, a second derived face data set related to the reference face data, where the second derived face data set includes multiple different derived face data. The processor 701 is configured to perform age determination for each of the multiple different derived face data in the second derived face data set and generate an age distribution interval corresponding to the second derived face data set. The processor 701 is configured to determine whether the age distribution interval corresponding to the second derived face data set matches a second reference age interval. The processor 701 is configured to update model parameters of the face data generating model when the age distribution interval corresponding to the second derived face data set does not match the second reference age interval, until the age distribution interval corresponding to the second derived face data set and obtained by performing age determination on each of the multiple different derived face data in the second derived face data set matches the second reference age interval.

In some embodiments, the processor 701 is further configured to, for each of the multiple different derived face data in the first derived face data set, determine an age corresponding thereto based on a predetermined age determining model (where the age determining model is configured to extract feature data from the derived face data and determine age data corresponding to the feature data), and generate the age distribution interval corresponding to the first derived face data set.

In some embodiments, the age determining model includes multiple feature-data determining models, and each of the multiple feature-data determining models is configured to determine feature data of a preset type and obtain, according to the feature data of the preset type, age data corresponding to the feature data of the preset type.

In some embodiments, the processor 701 is further configured to operate as follows prior to, for each of the multiple different derived face data in the first derived face data set, determining an age corresponding thereto through the preset age determining model, and generating the age distribution interval corresponding to the first derived face data set. The processor 701 is configured to obtain reference face data, where the reference face data includes age data. The processor 701 is configured to extract, according to the reference face data, feature data corresponding to the reference face data. The processor 701 is configured to generate the age determining model by associating the feature data with the age data corresponding to the feature data.

In some embodiments, the feature data is obtained from face data by deep learning and a convolutional neural network.

In some embodiments, the age determining model is generated by associating multiple feature-data determining models according to preset weights.

In some embodiments, the processor 701 is further configured to determine whether a degree of correlation between the age distribution interval obtained by performing age determination on each of the multiple different derived face data in the first derived face data set and the first reference age interval is greater than a preset threshold. In terms of obtaining, according to the age distribution interval, the age data corresponding to the face data to-be-tested when the age distribution interval matches the first reference age interval, the processor 701 is configured to obtain, according to the age distribution interval, the age data corresponding to the face data to-be-tested when the degree of correlation is greater than the preset threshold.

In some embodiments, the processor 701 is further configured to operate as follows. The processor 701 is configured to perform face aging and face rejuvenation on the face data to-be-tested in terms of different preset ages and generate the multiple derived face data which represent different ages and are related to the face data to-be-tested. The processor 701 is configured to obtain the first derived face data set by distributing the multiple derived face data sequentially according to ages corresponding to the multiple derived face data.

In some embodiments, the processor 701 is further configured to operate as follows. The processor 701 is configured to obtain, according to the age distribution interval, age median data corresponding to the age distribution interval. The processor 701 is configured to use the age median data as the age data corresponding to the face data to-be-tested.

The memory 702 is configured to store programs and data. The programs stored in the memory 702 include instructions operable with the processor 701. The programs can form various functional units. The processor 701 executes various functional applications and data processing by running the programs stored in the memory 702.

Figure 11:
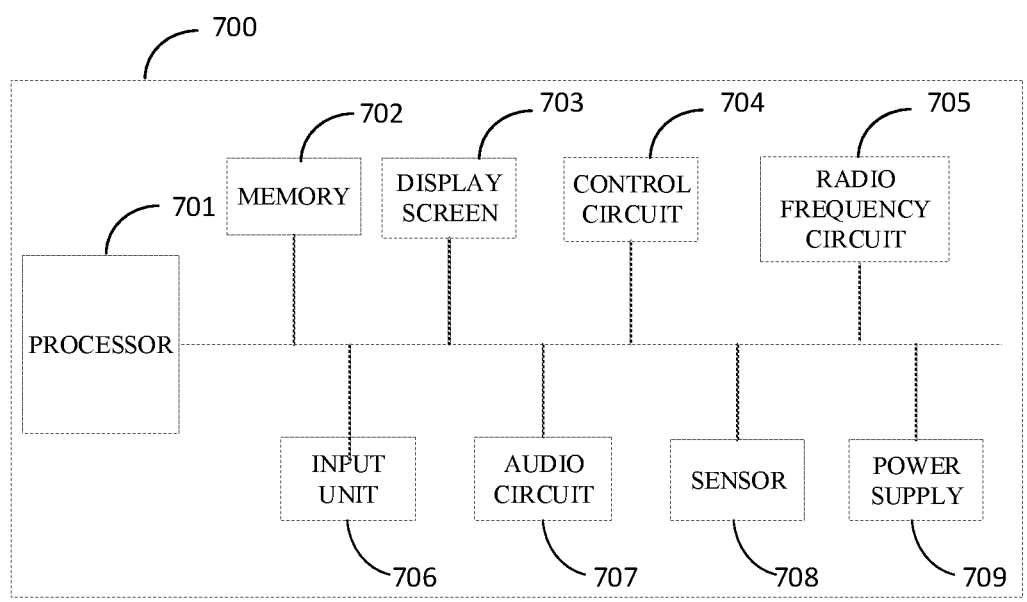
FIG. 11 is a schematic structural diagram illustrating an electronic device according to other embodiments.

In some embodiments, as illustrated in FIG. 11, the electronic device 700 further includes a display screen 703, a control circuit 704, a radio frequency circuit 705, an input unit 706, an audio circuit 707, a sensor 708, and a power supply 709. The processor 701 is electrically coupled with the radio frequency circuit 705, the input unit 706, the audio circuit 707, and power supply 709 respectively.

The display screen 703 is configured to display information entered by a user or information provided for the user as well as various graphical user interfaces of the electronic device. The graphical user interface may be composed of images, text, icons, video, and any combination thereof.

The control circuit 704 is electrically coupled with the display screen 703 and is configured to control the display screen 703 to display information.

The radio frequency circuit 705 is configured to transmit and receive (i.e., transceive) radio frequency signals, to establish wireless communication with a network device or other electronic devices through wireless communication and to transmit and receive signals with a network device or other electronic devices.

The input unit 706 is configured to receive inputted digit information, character information, or user feature information (e.g., fingerprints), and to generate, according to user settings and function controls, keyboard-based, mouse-based, joystick-based, optical or trackball signal inputs. The input unit 706 may include a fingerprint recognition module.

The audio circuit 707 is configured to provide an audio interface between a user and the electronic device through a speaker and a microphone.

The electronic device 700 may further include at least one sensor 708, such as a light sensor, a motion sensor, and other sensors.

The power supply 709 is configured to supply power to various components of the electronic device 700. In some embodiments, the power supply 709 may be logically coupled with the processor 701 via a power management system to achieve management of charging, discharging, and power consumption through the power management system.

Although not illustrated in FIG. 11, the electronic device 700 may further include a camera, a Bluetooth unit, and the like, which will not be elaborated herein.

According to embodiments, a non-transitory computer readable storage medium is further provided. The non-transitory computer readable storage medium is configured to store instructions. The instructions, when executed by a processor, are operable with the processor to execute the foregoing methods.

According to the electronic device provided herein, the face data generating model (i.e., the generator) can be obtained based on the GAN. Specifically, the second derived face data set is obtained through the face data generating model based on the reference face data, and accuracy of the second derived face data set is determined based on the second reference age interval, to optimize the face data generating model, such that the face data generating model can be reliable. Then, the first derived face data set related to the face data to-be-tested is generated through the face data generating model. Age determination is performed on each of the multiple derived face data in the first derived face data set based on the trained age determining model. After age determination is performed, aggregate age data and generate the age distribution interval, and then age data having a high degree of matching with the face data to-be-tested is obtained according to the age distribution interval. In this way, the problem of poor recognition accuracy due to an inappropriate image angle, overexposure, or darkness can be effectively solved in determining an age corresponding to the face data to-be-tested, thereby improving a fault tolerance rate of algorithms in a process of age determination. As such, face age recognition algorithms can be dynamically applicable to various environments and accuracy of face age recognition can be greatly improved.

It will be understood by those of ordinary skill in the art that all or a part of the various methods of the embodiments described above may be accomplished by means of programs to instruct associated hardware. The programs may be stored in a computer-readable storage medium. For example, the programs are stored in a memory of an electronic device. The programs, when executed by at least one processor of the electronic device, are operable with the at least one processor to execute operations of the foregoing embodiments. The computer-readable storage medium may include a read-only memory (ROM), a random-access memory (RAM), a magnetic disc, an optical disk, and so on.

While the disclosure has been described in connection with certain embodiments, it is to be understood that the disclosure is not to be limited to the disclosed embodiments, various changes and modifications can be made without departing from the spirit and scope of the invention. Therefore, the scope of the disclosure should be defined by the appended claims.

What is claimed is:

1. A method for face recognition, comprising:
obtaining face data to-be-tested;
performing face aging and face rejuvenation on the face data to-be-tested in terms of different preset ages, and generating multiple derived face data, the multiple derived face data representing different ages and being a set of synthetically generated faces obtained from the face data to-be-tested, with faces looking older and younger than a face in the face data to-be-tested;
obtaining a first derived face data set by distributing the multiple derived face data sequentially according to ages corresponding to the multiple derived face data;
for each of the multiple derived face data in the first derived face data set, performing age determination, and generating an age distribution interval corresponding to the first derived face data set;
determining whether the age distribution interval matches a first reference age interval comprising:
determining whether a degree of correlation between the age distribution interval obtained by performing age determination on each of the multiple derived face data in the first derived face data set and the first reference age interval is greater than a preset threshold, wherein the degree of correlation is a ratio of an overlap portion of the two intervals to an entire range of the age distribution interval; and
obtaining, according to the age distribution interval, age data corresponding to the face data to-be-tested, upon determining that the age distribution interval matches the first reference age interval, comprising:
upon determining that the degree of correlation is greater than the preset threshold, obtaining, according to the age distribution interval, the age data corresponding to the face data to-be-tested; or
upon determining that the degree of correlation is less than the preset threshold, adjusting endpoint values of the age distribution interval, until the age distribution interval matches the first reference age interval.

2. The method of claim 1, wherein
the first derived face data set is generated according to the face data to-be-tested based on a predetermined face data generating model; and
the method further comprises:
prior to performing the face aging and the face rejuvenation on the face data to-be-tested, generating the multiple derived face data, and obtaining the first derived face data set:
obtaining reference face data;
generating, according to the reference face data, a second derived face data set related to the reference face data, wherein the second derived face data set comprises multiple different derived face data;
for each of the multiple different derived face data in the second derived face data set, performing age determination, and generating an age distribution interval corresponding to the second derived face data set;
determining whether the age distribution interval corresponding to the second derived face data set matches a second reference age interval; and
upon determining that the age distribution interval corresponding to the second derived face data set does not match the second reference age interval, updating model parameters of the predetermined face data generating model, until the age distribution interval corresponding to the second derived face data set and obtained by performing age determination on each of the multiple different derived face data in the second derived face data set matches the second reference age interval.

3. The method of claim 1, wherein for each of the multiple derived face data in the first derived face data set, performing the age determination, and generating the age distribution interval corresponding to the first derived face data set comprise:
for each of the multiple derived face data in the first derived face data set, determining an age corresponding thereto based on a predetermined age determining model, and generating the age distribution interval corresponding to the first derived face data set; wherein
the predetermined age determining model is configured to extract feature data from the derived face data and determine age data corresponding to the feature data.

4. The method of claim 3, wherein the predetermined age determining model comprises a plurality of feature-data determining models, and each of the plurality of feature-data determining models is configured to determine feature data of a preset type and obtain, according to the feature data of the preset type, age data corresponding to the feature data of the preset type.

5. The method of claim 3, further comprising:
prior to, for each of the multiple derived face data in the first derived face data set, determining the age corresponding thereto based on the predetermined age determining model, and generating the age distribution interval corresponding to the first derived face data set:
obtaining reference face data, wherein the reference face data comprises age data;
extracting, according to the reference face data, feature data corresponding to the reference face data; and
generating the predetermined age determining model by associating the feature data with the age data corresponding to the feature data.

6. The method of claim 3, wherein the feature data is obtained from face data by deep learning and a convolutional neural network.

7. The method of claim 1, wherein obtaining, according to the age distribution interval, the age data corresponding to the face data to-be-tested comprises:
obtaining, according to the age distribution interval, age median data corresponding to the age distribution interval; and
using the age median data as the age data corresponding to the face data to-be-tested.

8. The method of claim 1, wherein for each of the multiple derived face data in the first derived face data set, performing age determination, and generating the age distribution interval corresponding to the first derived face data set comprise:
　for each of the multiple derived face data in the first derived face data set,
　　extracting a plurality of feature data from the derived face data based on a predetermined age determining model, wherein the predetermined age determining model is generated by associating a plurality of feature-data determining models according to preset weights; and
　　for each of the plurality of feature data, performing age determination on the feature data based on the predetermined age determining model, to obtain ages corresponding to the plurality of feature data, and determining an age corresponding to the derived face data by aggregating the ages corresponding to the plurality of feature data; and
　the method further comprises:
　　generating, according to a plurality of ages determined, the age distribution interval corresponding to the first derived face data set.

9. The method of claim 1, wherein the first reference age interval is obtained by performing age determination on the face data to-be-tested.

10. A non-transitory computer readable storage medium configured to store instructions which, when executed by a processor, cause the processor to carry out actions, comprising:
　obtaining face data to-be-tested;
　performing face aging and face rejuvenation on the face data to-be-tested in terms of different preset ages, and generating multiple derived face data, the multiple derived face data representing different ages and being a set of synthetically generated faces obtained from the face data to-be-tested, with faces looking older and younger than a face in the face data-to-be tested;
　obtaining a first derived face data set by distributing the multiple derived face data sequentially according to ages corresponding to the multiple derived face data;
　for each of the multiple derived face data in the first derived face data set, performing age determination, and generating an age distribution interval corresponding to the first derived face data set;
　determining whether the age distribution interval matches a first reference age interval comprising:
　　determining whether a degree of correlation between the age distribution interval obtained by performing age determination on each of the multiple derived face data in the first derived face data set and the first reference age interval is greater than a preset threshold, wherein the degree of correlation is a ratio of an overlap portion of the two intervals to an entire range of the age distribution interval; and
　obtaining, according to the age distribution interval, age data corresponding to the face data to-be-tested, upon determining that the age distribution interval matches the first reference age interval, comprising:
　　upon determining that the degree of correlation is greater than the preset threshold obtaining, according to the age distribution interval, the age data corresponding to the face data to-be-tested; or
　　upon determining that the degree of correlation is less than the preset threshold, adjusting endpoint values of the age distribution interval until the age distribution interval matches the first reference age interval.

11. The non-transitory computer readable storage medium of claim 10, wherein the instructions are further executed by the processor to carry out actions, comprising:
　obtaining reference face data, wherein the first derived face data set is generated according to the face data to-be-tested based on a predetermined face data generating model;
　generating, according to the reference face data, a second derived face data set related to the reference face data, wherein the second derived face data set comprises multiple different derived face data;
　for each of the multiple different derived face data in the second derived face data set, performing age determination, and generating an age distribution interval corresponding to the second derived face data set;
　determining whether the age distribution interval corresponding to the second derived face data set matches a second reference age interval; and
　upon determining that the age distribution interval corresponding to the second derived face data set does not match the second reference age interval, updating model parameters of the predetermined face data generating model, until the age distribution interval corresponding to the second derived face data set and obtained by performing age determination on each of the multiple different derived face data in the second derived face data set matches the second reference age interval.

12. The non-transitory computer readable storage medium of claim 10, wherein the instructions executed by the processor to carry out the action of performing, for each of the multiple derived face data in the first derived face data set, age determination, and generating the age distribution interval corresponding to the first derived face data set are executed by the processor to carry out actions, comprising:
　for each of the multiple derived face data in the first derived face data set, determining an age corresponding thereto based on a predetermined age determining model, and generating the age distribution interval corresponding to the first derived face data set; wherein the predetermined age determining model is configured to extract feature data from the derived face data and determine age data corresponding to the feature data.

13. The non-transitory computer readable storage medium of claim 12, wherein the predetermined age determining model comprises a plurality of feature-data determining models, and each of the plurality of feature-data determining models is configured to determine feature data of a preset type and obtain, according to the feature data of the preset type, age data corresponding to the feature data of the preset type.

14. The non-transitory computer readable storage medium of claim 10, wherein the instructions executed by the processor to carry out the action of obtaining, according to the age distribution interval, the age data corresponding to the face data to-be-tested are executed by the processor to carry out actions, comprising:
　obtaining, according to the age distribution interval, age median data corresponding to the age distribution interval; and
　using the age median data as the age data corresponding to the face data to-be-tested.

15. An electronic device, comprising:
　at least one processor; and a computer readable storage, coupled to the at least one processor and storing at least one computer executable instruction thereon which, when executed by the at least one processor, is operable with the at least one processor to:
obtain face data to-be-tested;
perform face aging and face rejuvenation on the face data to-be-tested in terms of different preset ages, and generate multiple derived face data, the multiple derived face data representing different ages and being a set of synthetically generated faces obtained from the face data to-be-tested, with faces looking older and younger than a face in the data to-be-tested;
obtain a first derived face data set by distributing the multiple derived face data sequentially according to ages corresponding to the multiple derived face data;
for each of the multiple derived face data in the first derived face data set, perform age determination, and generate an age distribution interval corresponding to the first derived face data set;
determine whether the age distribution interval matches a first reference age interval, comprising:
determine whether a degree of correlation between the age distribution interval obtained by performing age determination on each of the multiple derived face data in the first derived face data set and the first reference age interval is greater than a preset threshold, wherein the degree of correlation is a ratio of an overlap portion of the two intervals to an entire range of the age distribution interval; and
obtain, according to the age distribution interval, age data corresponding to the face data to-be-tested, upon determining that the age distribution interval matches the first reference age interval, comprising:
upon determining that the degree of correlation is greater than the preset threshold, obtain, according to the age distribution interval, the age data corresponding to the face data to-be-tested; or
upon determining that the degree of correlation is less than the preset threshold, adjust endpoint values of the age distribution interval, until the age distribution interval matches the first reference age interval.

16. The electronic device of claim 15, wherein the at least one computer executable instruction is further operable with the at least one processor to:
obtain reference face data, wherein the first derived face data set is generated according to the face data to-be-tested based on a predetermined face data generating model;
generate, according to the reference face data, a second derived face data set related to the reference face data, wherein the second derived face data set comprises multiple different derived face data;
for each of the multiple different derived face data in the second derived face data set, perform age determination, and generate an age distribution interval corresponding to the second derived face data set;
determine whether the age distribution interval corresponding to the second derived face data set matches a second reference age interval; and
upon determining that the age distribution interval corresponding to the second derived face data set does not match the second reference age interval, update model parameters of the predetermined face data generating model, until the age distribution interval corresponding to the second derived face data set and obtained by performing age determination on each of the multiple different derived face data in the second derived face data set matches the second reference age interval.

17. The electronic device of claim 15, wherein the at least one computer executable instruction operable with the at least one processor to perform, for each of the multiple derived face data in the first derived face data set, age determination, and generate the age distribution interval corresponding to the first derived face data set is operable with the at least one processor to:
for each of the multiple derived face data in the first derived face data set, determine an age corresponding thereto based on a predetermined age determining model, and generate the age distribution interval corresponding to the first derived face data set; wherein
the predetermined age determining model is configured to extract feature data from the derived face data and determine age data corresponding to the feature data.

18. The electronic device of claim 17, wherein the at least one computer executable instruction is further operable with the at least one processor to:
obtain reference face data, wherein the reference face data comprises age data;
extract, according to the reference face data, feature data corresponding to the reference face data; and
generate the predetermined age determining model by associating the feature data with the age data corresponding to the feature data.

19. The electronic device of claim 17, wherein the predetermined age determining model comprises a plurality of feature-data determining models, and each of the plurality of feature-data determining models is configured to determine feature data of a preset type and obtain, according to the feature data of the preset type, age data corresponding to the feature data of the preset type.

20. The electronic device of claim 15, wherein the at least one computer executable instruction operable with the at least one processor to obtain, according to the age distribution interval, the age data corresponding to the face data to-be-tested is operable with the at least one processor to:
obtain, according to the age distribution interval, age median data corresponding to the age distribution interval; and
use the age median data as the age data corresponding to the face data to-be-tested.

* * * * *